United States Patent
Moriya

(10) Patent No.: US 11,017,218 B2
(45) Date of Patent: May 25, 2021

(54) SUSPICIOUS PERSON DETECTION DEVICE, SUSPICIOUS PERSON DETECTION METHOD, AND PROGRAM

(71) Applicant: NEC CORPORATION, Tokyo (JP)

(72) Inventor: Atsushi Moriya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 163 days.

(21) Appl. No.: 16/315,235

(22) PCT Filed: Jul. 3, 2017

(86) PCT No.: PCT/JP2017/024289
§ 371 (c)(1),
(2) Date: Jan. 4, 2019

(87) PCT Pub. No.: WO2018/008575
PCT Pub. Date: Jan. 11, 2018

(65) Prior Publication Data
US 2019/0163966 A1    May 30, 2019

(30) Foreign Application Priority Data
Jul. 5, 2016  (JP) .............................. JP2016-133164

(51) Int. Cl.
*G06K 9/62* (2006.01)
*G06K 9/00* (2006.01)
(Continued)

(52) U.S. Cl.
CPC ......... *G06K 9/00335* (2013.01); *G08B 21/22* (2013.01); *H04N 7/188* (2013.01); *G06K 9/0061* (2013.01); *G06K 9/00268* (2013.01)

(58) Field of Classification Search
CPC ............ G06K 9/00335; G06K 9/00771; G06T 2207/30232
See application file for complete search history.

(56) References Cited

U.S. PATENT DOCUMENTS

| 9,892,315 B2* | 2/2018 | Voss ......................... G09B 7/02 |
| 2010/0080418 A1* | 4/2010 | Ito ........................ G06K 9/00335 382/103 |

FOREIGN PATENT DOCUMENTS

| JP | 2007-006427 A | 1/2007 |
| JP | 2009-246799 A | 10/2009 |

(Continued)

OTHER PUBLICATIONS

Google Patents machine translation of JP2007006427A, to Horii et al., published in Nov. 1, 2007, pp. 1/10-10/10. (Year: 2007).*

(Continued)

*Primary Examiner* — Brian Werner
(74) *Attorney, Agent, or Firm* — Sughrue Mion, PLLC

(57) ABSTRACT

The present invention provides a technology that can reduce erroneous detection and detect a suspicious person from an image at high accuracy. A suspicious person detection device according to one example embodiment of the present invention includes: an eye direction detection unit that detects an eye direction of a subject; a face direction detection unit that detects a face direction of the subject; an environment information acquisition unit that acquires environment information indicating arrangement of an object around the subject; and a determination unit that, based on the face direction, the eye direction, and the environment information, determines whether or not the subject is showing suspicious behavior.

10 Claims, 16 Drawing Sheets

(51) Int. Cl.
  *H04N 7/18* (2006.01)
  *G08B 21/22* (2006.01)

(56) References Cited

FOREIGN PATENT DOCUMENTS

| | | |
|---|---|---|
| JP | 2011-192157 A | 9/2011 |
| JP | 2015-230569 A | 12/2015 |

OTHER PUBLICATIONS

Nicole Lasky et al, "Glossing Over Shoplifting: How Thieves Act Normal", Journal, Deviant Behavior, vol. 36, 2015—Issue 4, Accepted May 7, 2014, Published online: Dec. 9, 2014, cover/bib page and pp. 1-44. (Year: 2015).*

The YouTube video posed by Dexter Gaspard, "Shoplifter Caught on Camera by GDC, Luxriot Software and Xavee cameras", posted on Nov. 13, 2015, at youtube.com/watch?v=Tu2WLSZjgow, screen shot captured at 00:51, 3 pages total. (Year: 2015).*

The YouTube video posed by Raw Cut Archive, shoplifting Caught on Camera, posted on Feb. 12, 2016, at youtube.com/watch?v=XUiqCVZYloa, screen shot captured at 2:54, 2 pages total. (Year: 2016).*

* cited by examiner

FIG. 8

| TIME | ─1101a |
| CAMERA ID |
| FACE IMAGE |
| TRACKING ID |
| FACE POSITION |
| EYE POSITION |
| EYE DIRECTION |
| FACE DIRECTION |
| STATE |
| SCORE |

SUSPICIOUS PERSON DETECTION DEVICE, SUSPICIOUS PERSON DETECTION METHOD, AND PROGRAM

This Application is a National Stage of International Application No. PCT/JP2017/024289 filed Jul. 3, 2017, claiming priority based on Japanese Patent Application No. 2016-133164 filed Jul. 5, 2016, the disclosure of which is incorporated herein in its entirety by reference.

TECHNICAL FIELD

The present invention relates to a device, a method, and a program that detect a suspicious person from an image.

BACKGROUND ART

In a retail industry or a logistics industry, there is a problem of loss of items because of wrongdoing such as theft made by a customer or an employee, that is, a problem of occurrence of missing-loss. Conventionally, it may be possible to install a surveillance camera around a store shelf or the like and inspect wrongdoing later by reviewing a captured image. However, inspection after an incident may involve significant labor and danger. It is therefore desirable to detect a customer or an employee (suspicious person) who is showing suspicious behavior before occurrence of an incident and take precautions such as questioning a suspicious person.

Advancement of information processing technologies and increase in resolution of surveillance cameras have made it possible to detect a person from an image captured by a surveillance camera and, further, estimate the orientation of the face or the direction of a line of sight of the detected person. As application of such a technology, a technology for automatically detecting a suspicious person from an image has been developed.

The technology disclosed in Patent Literature 1 is to acquire a face direction and an eye direction of a person from an image and then detect a suspicious person based on a dispersion value or a motion amount of the line of sight or based on behavior that causes a large angle difference between the face direction and the eye direction.

CITATION LIST

Patent Literature

PTL 1: Japanese Patent Application Laid-Open No. 2007-6427

SUMMARY OF INVENTION

Technical Problem

In the technology disclosed in Patent Literature 1, however, a suspicious person is detected based only on a face direction and an eye direction of a person to be detected. Thus, it is not possible to consider the environment around a person resulting in occurrence of erroneous detection in which a person who is showing normal behavior with respect to a relationship with the environment is determined to be a suspicious person or, contrarily, a person who is showing abnormal behavior is determined to be not a suspicious person.

The present invention has been made in view of the problems described above and intends to provide a technology that can reduce erroneous detection and detect a suspicious person from an image at high accuracy.

Solution to Problem

A first example aspect of the present invention is a suspicious person detection device including: an eye direction detection unit that detects an eye direction of a subject; a face direction detection unit that detects a face direction of the subject; an environment information acquisition unit that acquires environment information indicating arrangement of an object around the subject; and a determination unit that, based on the face direction, the eye direction, and the environment information, determines whether or not the subject is showing suspicious behavior.

A second example aspect of the present invention is a suspicious person detection method including steps of: detecting an eye direction of a subject; detecting a face direction of the subject; acquiring environment information indicating arrangement of an object around the subject; and based on the face direction, the eye direction, and the environment information, determining whether or not the subject is showing suspicious behavior.

A third example aspect of the present invention is a program that causes a computer to execute steps of: detecting an eye direction of a subject; detecting a face direction of the subject; acquiring environment information indicating arrangement of an object around the subject; and based on the face direction, the eye direction, and the environment information, determining whether or not the subject is showing suspicious behavior.

Advantageous Effects of Invention

According to the present invention, since suspicious behavior is determined based on environment information indicating arrangement of an object around a subject in addition to the eye direction and the face direction of the subject, erroneous detection can be reduced, and a suspicious person can be detected at high accuracy.

BRIEF DESCRIPTION OF DRAWINGS

FIG. 8 is a schematic diagram of an exemplary detection result according to the first example embodiment.

DESCRIPTION OF EMBODIMENTS

While example embodiments of the present invention will be described below with reference to the drawings, the present invention is not limited to these example embodiments. Note that, throughout the drawings described below, components having the same function are labeled with the same references, and the repeated description thereof may be omitted.

First Example Embodiment

Figure 1:
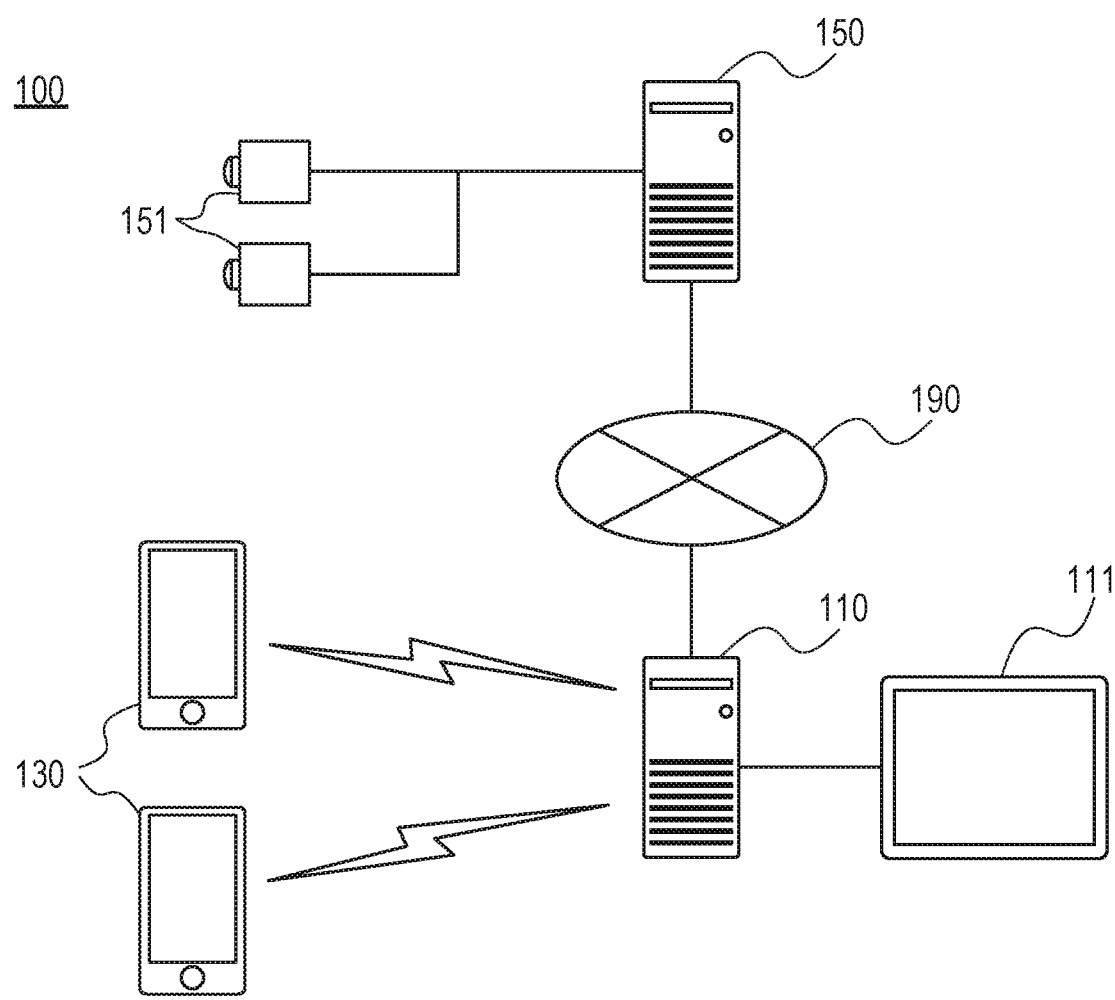
FIG. 1 is a schematic diagram of a suspicious person detection system according to a first example embodiment.

FIG. 1 is a schematic diagram of a suspicious person detection system 100 according to the present example embodiment. The suspicious person detection system 100 has a suspicious person detection device 110, a mobile terminal 130, and a surveillance camera recording device 150. The suspicious person detection device 110 and the surveillance camera recording device 150 are connected to each other by wired connection or wireless connection via a network 190 such as the Internet. The suspicious person detection device 110 and the mobile terminal 130 are connected by wireless connection such as wireless Local Area Network (LAN), a mobile communication, or the like. The surveillance camera recording device 150 is a device that records images from one or more cameras 151. The suspicious person detection device 110 is a device that detects a suspicious person from images recorded by the surveillance camera recording device 150 and displays a detection result on a display 111. The mobile terminal 130 is a portable communication terminal that displays a notification from the suspicious person detection device 110. The suspicious person detection system 100 may include other devices such as a server, a terminal, or the like.

Figure 2:
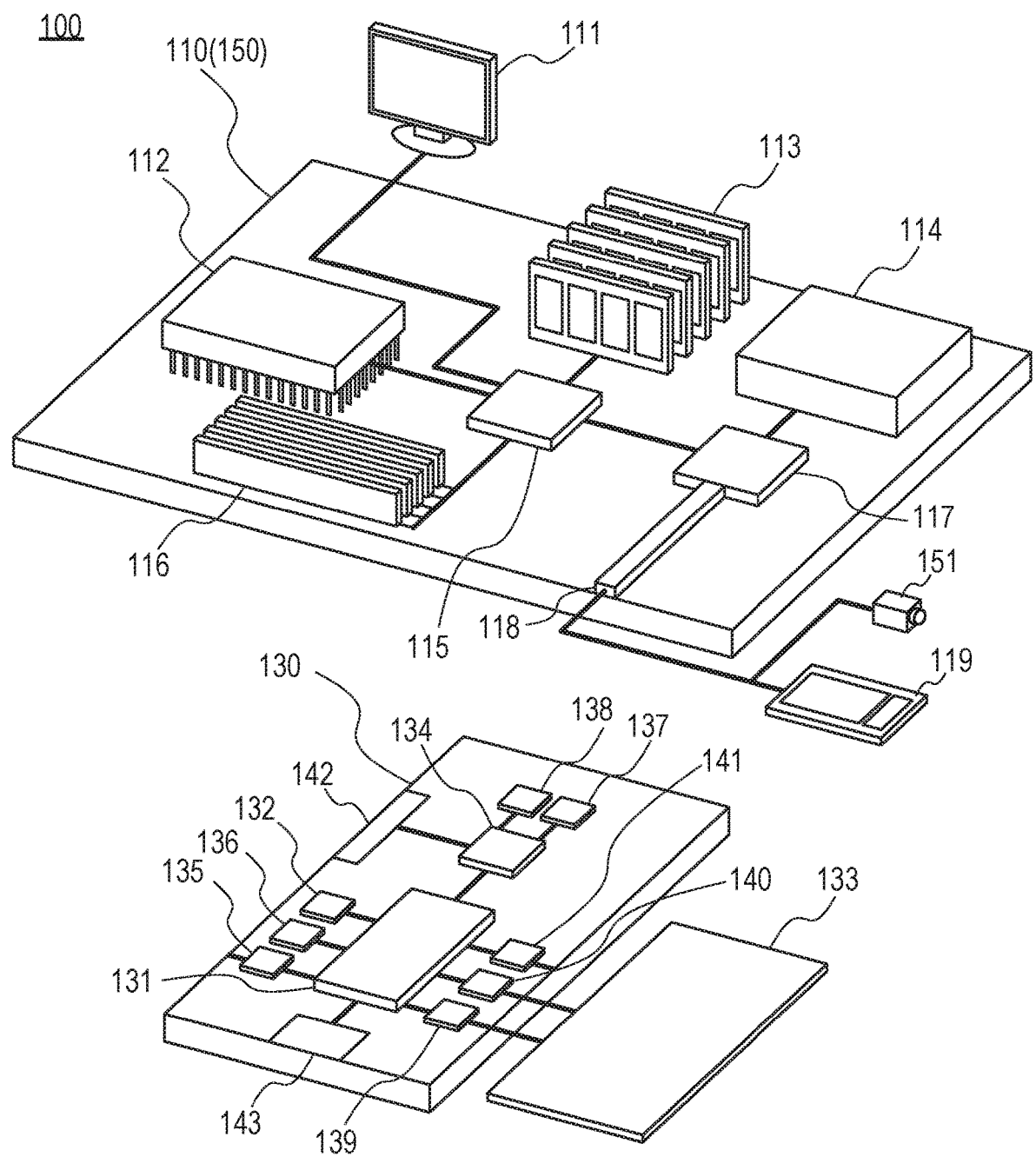
FIG. 2 is a general configuration diagram of the suspicious person detection system according to the first example embodiment.

FIG. 2 is a general configuration diagram of the suspicious person detection system 100 according to the present example embodiment. The suspicious person detection device 110, the mobile terminal 130, and the surveillance camera recording device 150 may be formed of a single device, respectively, or may be formed of two or more physically separate devices connected via a wire or wirelessly. For example, the suspicious person detection device 110 and the surveillance camera recording device 150 may be a laptop computer, a desktop computer, a workstation, a personal digital assistant, a server, a blade server, a mainframe, an embedded system, or the like. For example, the mobile terminal 130 may be any communication terminal such as a personal digital assistant, a mobile phone, a smartphone, or the like. The specific hardware configuration of the suspicious person detection device 110, the mobile terminal 130, and the surveillance camera recording device 150 is not limited to the following configuration but may be of various types or forms.

The suspicious person detection device 110 and the surveillance camera recording device 150 have configurations common to each other. Each of the suspicious person detection device 110 and the surveillance camera recording device 150 has a processor 112, a memory 113, and a storage device 114. Further, each of the suspicious person detection device 110 and the surveillance camera recording device 150 has a high-speed controller 115 including a high-speed interface and a low-speed controller 117 including a low-speed interface. The memory 113 and a high-speed expansion port 116 are connected to the high-speed controller 115. Further, a display device such as the display 111 or the like is connected to the high-speed controller 115. On the other hand, a low-speed expansion port 118 and the storage device 114 are connected to the low-speed controller 117.

The processor 112, the memory 113, the storage device 114, the high-speed controller 115, the low-speed controller 117, and the high-speed expansion port 116 are connected to each other through various buses. Further, the processor 112, the memory 113, the storage device 114, the high-speed controller 115, the low-speed controller 117, and the high-speed expansion port 116 may be implemented on a common motherboard or may be implemented in other forms as appropriate.

The processor 112 is a central processing unit (CPU), for example, and is able to process instructions executed within the suspicious person detection device 110 and the surveillance camera recording device 150. Such instructions include an instruction that is used for displaying graphics information of a graphical user interface (GUI) on a display device such as the display 111 and stored in the memory 113 or the storage device 114.

Further, a plurality of processors, a plurality of busses, or a plurality of processors and a plurality of busses can be used as appropriate together with a plurality of memory devices and multiple types of memory devices. Further, a plurality of suspicious person detection devices 110 or surveillance camera recording devices 150 can be connected to each device that performs a part of the necessary process. For example, a plurality of suspicious person detection devices 110 or a plurality of surveillance camera recording devices 150 can be connected to each other as a server bank, a group of blade servers, or a multiprocessor system.

The memory 113 stores therein information within the suspicious person detection device 110 and the surveillance camera recording device 150. For example, the memory 113 may be a volatile memory unit, a non-volatile memory unit, or a combination thereof. The memory 113 may be another computer readable storage medium, such as a magnetic disk, an optical disk, or the like, for example.

The storage device 114 can configure mass storage used for the suspicious person detection device 110 and the surveillance camera recording device 150. The storage device 114 may be, for example, a computer readable storage medium such as a floppy (registered trademark) disk device, a hard disk device, an optical disk device, a tape device, a solid state memory device such as a flash memory, a disk array, or the like or may include such a computer readable storage medium. The storage device 114 may be a storage area network or a device with another configuration.

The high-speed controller 115 manages processes in which the bandwidth for the suspicious person detection device 110 and the surveillance camera recording device 150 is intensively used. On the other hand, the low-speed controller 117 manages processes in which the bandwidth is less intensively used. However, such allocation of the functions is a mere example, and allocation is not limited thereto. Further, a part or a whole of the high-speed controller 115 may be incorporated in the processor 112.

The high-speed controller 115 is connected to the high-speed expansion port 116 that can accept the memory 113 and various expansion cards. Further, the high-speed controller 115 is connected to the display 111 via a graphics processor or an accelerator, for example.

The low-speed controller 117 is connected to the storage device 114 and the low-speed expansion port 118. The low-speed expansion port 118 can include, for example, a communication port of various standards such as Universal Serial Bus (USB), Bluetooth (registered trademark), wired or wireless Ethernet (registered trademark), or the like. One or a plurality of input devices 119 such as a keyboard, a pointing device, a scanner, or the like can be connected to the low-speed expansion port 118. Furthermore, one or a plurality of cameras 115 are connected to the low-speed expansion port 118 in the surveillance camera recording device 150 in particular. Further, one or a plurality of network devices such as a switch, a router, or the like can be connected to the low-speed expansion port 118 via a network adapter, for example. That is, the low-speed expansion port 118 functions as a communication interface.

The suspicious person detection device 110 and the surveillance camera recording device 150 can be implemented in many different forms without being limited to the forms described above. For example, the suspicious person detection device 110 and the surveillance camera recording device 150 can be implemented in a form of a typical server or a plurality of servers in a form of a group of such servers. Further, the suspicious person detection device 110 and the surveillance camera recording device 150 can be implemented as a part of the rack server system. Furthermore, the suspicious person detection device 110 and the surveillance camera recording device 150 can be implemented in a form of a personal computer such as a laptop computer, a desktop computer, or the like. Further, the suspicious person detection device 110 and the surveillance camera recording device 150 may be combined to be implemented as a single device.

Note that a part or the whole of the program executed by the processor 112 of the suspicious person detection device 110 and the surveillance camera recording device 150 can be provided by a computer readable storage medium storing the above, such as a digital versatile disc-read only memory (DVD-ROM), a compact disc-read only memory (CD-ROM), a flash memory such as a USB memory or the like.

The mobile terminal 130 has a processor 131, a memory 132, a display 133, a communication interface 134, a camera 135, and an electronic compass 136. The mobile terminal 130 may have a storage device such as a micro-drive, a flash memory, or the like as an additional storage. Respective components of the mobile terminal 130 are connected to each other by using various buses. At least some of the components of the mobile terminal 130 may be attached on a common motherboard or may be attached in a different manner.

The processor 131 can execute an instruction within the mobile terminal 130, such as an instruction stored in the memory 132. The processor 131 may be implemented as a chip or a chipset having one or a plurality of analog or digital processors. The processor 131 controls other components of the mobile terminal 130 to perform display of a user interface, execution of an application, wireless communication, or the like, for example.

The processor 131 can input and output information to the user through a display interface 139 connected to the display 133 and the input interface 140. Any display unit such as a liquid crystal display, an organic electroluminescence (EL) display, or the like, for example may be used as the display 133. The display interface 139 has a circuit required for driving the display 133 so as to present an image and other information to the user. Further, the display 133 is configured as a touchscreen and outputs a user operation as an electrical signal. The input interface 140 receives electrical signals indicating a user operation performed on the display 133 and performs conversion of these electrical signals for transmission to the processor 131.

The memory 132 stores therein information present in the mobile terminal 130. The memory 132 may be a computer readable storage medium, a volatile memory unit, a non-volatile memory unit, or a combination thereof, for example. As the memory 132, for example, a flash memory, a non-volatile random access memory (NVRAM), or the like may be used.

The camera 135 is an image capturing unit that outputs an image of a capturing result as digital data. As the camera 135, any image capturing device such as a Charge Coupled Device (CCD) camera, a Complementary Metal Oxide Semiconductor (CMOS) camera, or the like may be used. The camera 135 includes an image pickup device, an electric circuit, a lens, or the like necessary for image capturing.

The electronic compass 136 is an acquisition unit that acquires the orientation of the mobile terminal 130. As the electronic compass 136, any device such as a geomagnetism sensor that is capable of acquiring the orientation of the mobile terminal 130 may be used.

The communication interface 134 is connected to a global positioning system (GPS) receiver 137 and a mobile communication device 138. The mobile communication device 138 performs mobile communication using any mode or protocol including voice communication of a Global System for Mobile communication (GSM) (registered trademark) scheme or the like, messaging of a Short Message Service (SMS) or the like, and data communication of a Code Division Multiple Access (CDMA) scheme or the like. The mobile communication device 138 includes a processor, an electric circuit, an antenna, or the like necessary for mobile communication.

The mobile terminal 130 can communicate in voice by using an audio interface 141. The audio interface 141 is connected to a microphone and a speaker. The audio interface 141 receives utterance information from a user through a microphone and converts the utterance information into digital information that can be processed by the processor 131. Further, the audio interface 141 can generate an audible sound to the user through a speaker, for example. The audio output by the audio interface 141 includes an audio from voice communication, an audio recorded in the memory 132

(for example, a voice message, a music file, or the like), or an audio generated by an application operating on the mobile terminal 130.

The mobile terminal 130 is provided with an extension interface 142 and an external interface 143. An extended memory is connected to the extension interface 142, for example. The extended memory may function as additional storage to the mobile terminal 130 and may store a program running on the mobile terminal 130 or other information. Further, the extended memory may store secure information and, in such a case, function as a security module.

The external interface 143 is configured to communicate with the processor 131 and can perform wired communication or wireless communication. The external interface 143 performs near field communication with Bluetooth (registered trademark) or the like or wireless communication with a wireless LAN or the like between the mobile terminal 130 and another device, for example. As the external interface 143, a plurality of interfaces may be combined and used.

Figure 3A:
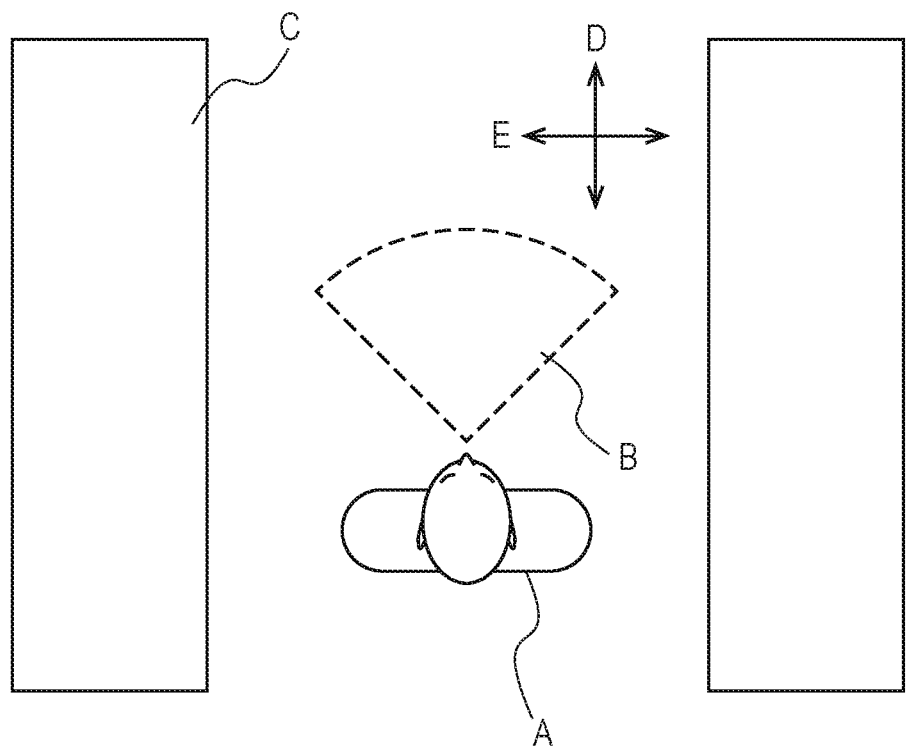
FIG. 3A is a schematic diagram illustrating an environment around a subject to be detected.
Figure 3B:
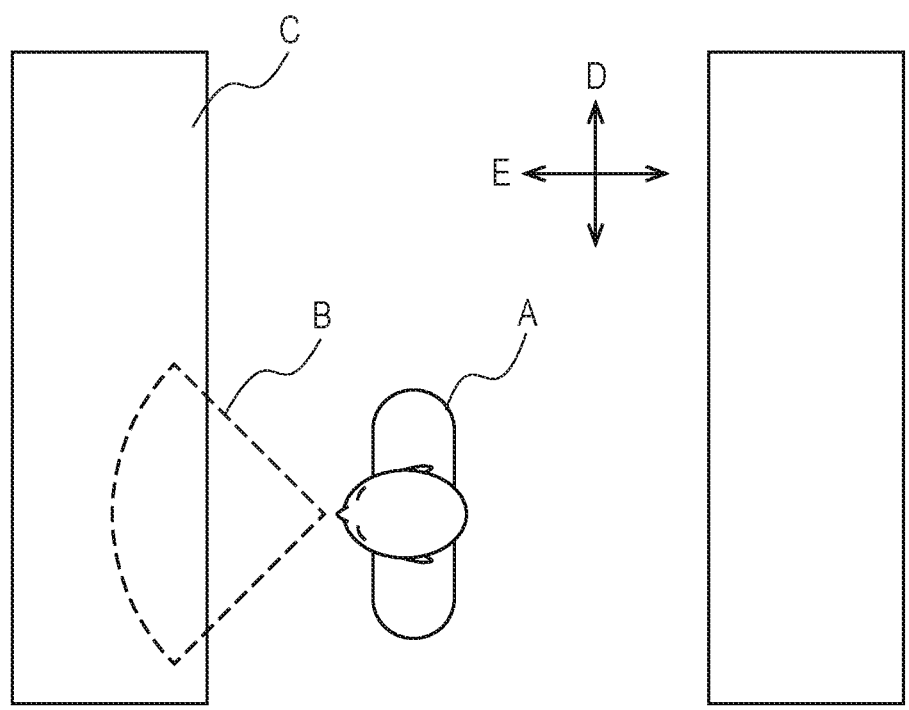
FIG. 3B is a schematic diagram illustrating an environment around a subject to be detected.

FIG. 3A and FIG. 3B are schematic diagrams illustrating an environment around a subject A in a suspicious person detection in the present example embodiment. FIG. 3A and FIG. 3B illustrate states where the subject A and a store shelf C are viewed from the upper part in the gravity direction. In general, since an aisle is arranged beside the store shelf C, a direction along the isle can be defined as an aisle direction D, and a direction toward the store shelf C can be defined as an item direction E. The aisle direction D and the item direction E are defined in any way in accordance with the layout of the store shelf C and the aisle.

The subject A has a field of view B that is a range visible along the line of sight direction. As normal behavior, when the subject A is moving to the store shelf C that displays an intended item, the subject A directs the field of view B to the aisle direction D as illustrated in FIG. 3A. As another normal behavior, when the subject A is watching the store shelf C that displays an intended item, the subject A directs the field of view B to the item direction E as illustrated in FIG. 3B. The suspicious person detection system 100 according to the present example embodiment determines the above behavior as normal behavior and detects behavior different from the above behavior as suspicious behavior.

While FIG. 3A and FIG. 3B illustrate the store shelf C used for displaying items in a retail industry, a belt conveyer or a cargo used for transporting items corresponds to the store shelf C in a logistics industry. In this case, the direction toward the belt conveyer or the cargo is the item direction E, and it may be possible that an employee steals an item while watching the aisle direction D.

Figure 4:
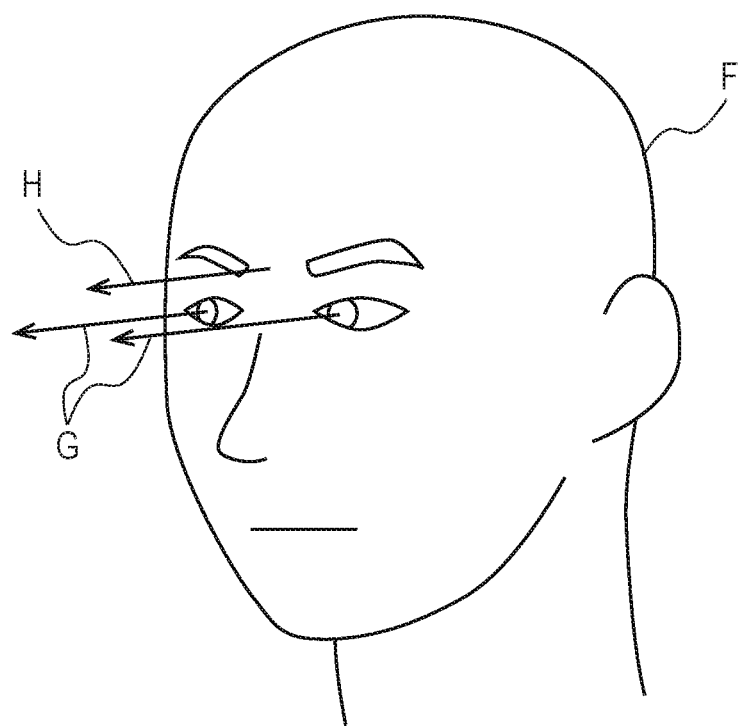
FIG. 4 is a schematic diagram of a face of a subject to be detected.

FIG. 4 is a schematic diagram of a face F of the subject A showing normal behavior. Further, FIG. 5A to FIG. 5C and FIG. 6A to FIG. 6B are schematic diagrams of the face F of the subject A showing suspicious behavior. The orientation of the line of sight of the subject A is defined as an eye direction G, and the orientation of the face F of the subject A is defined as the face direction H. In FIG. 4, FIG. 5A to FIG. 5C, and FIG. 6A to FIG. 6B, the eye direction G and the face direction H are represented by arrows. As illustrated in FIG. 4, in normal behavior, the eye direction G and the face direction H are substantially matched.

Figure 5A:
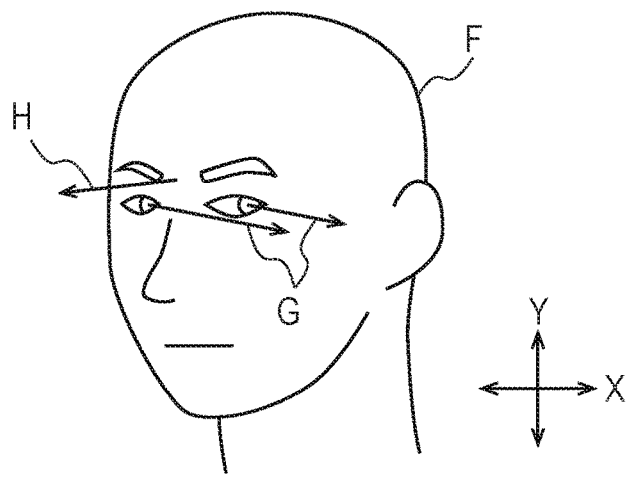
FIG. 5A is a schematic diagram of a face of a subject to be detected.

As an example of suspicious behavior, FIG. 5A illustrates a state where the eye direction G and the face direction H are mismatched from each other. Typically, when watching an item, the subject A often moves the face and directs the line of sight to the item. In contrast, when trying to steal an item, the subject A often checks the surrounding situation. At this time, to avoid being suspected by others, the subject A may move only the line of sight while facing the item to check the surrounding situation. Thus, determination whether or not there is a mismatch state where the eye direction G and the face direction H are significantly different from each other as illustrated in FIG. 5A can be used for detection of a suspicious person.

Figure 5B:
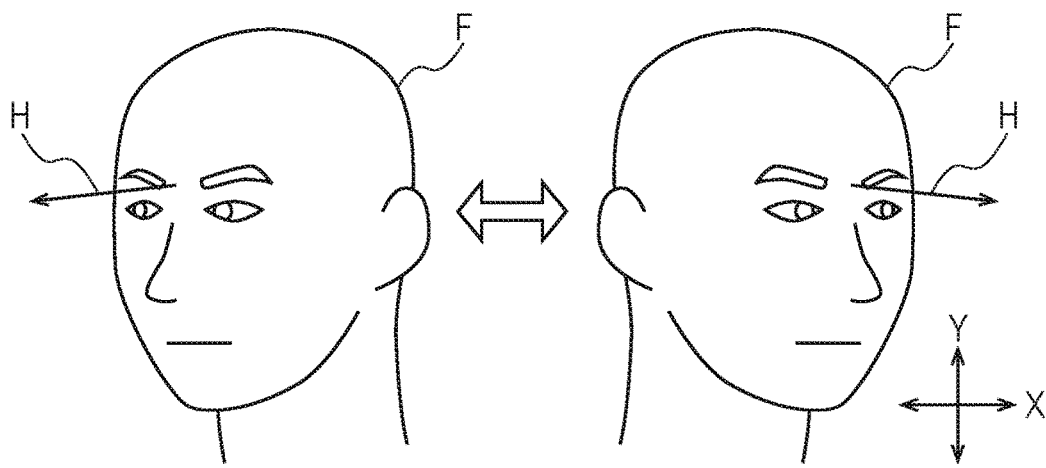
FIG. 5B is a schematic diagram of a face of a subject to be detected.
Figure 6A:
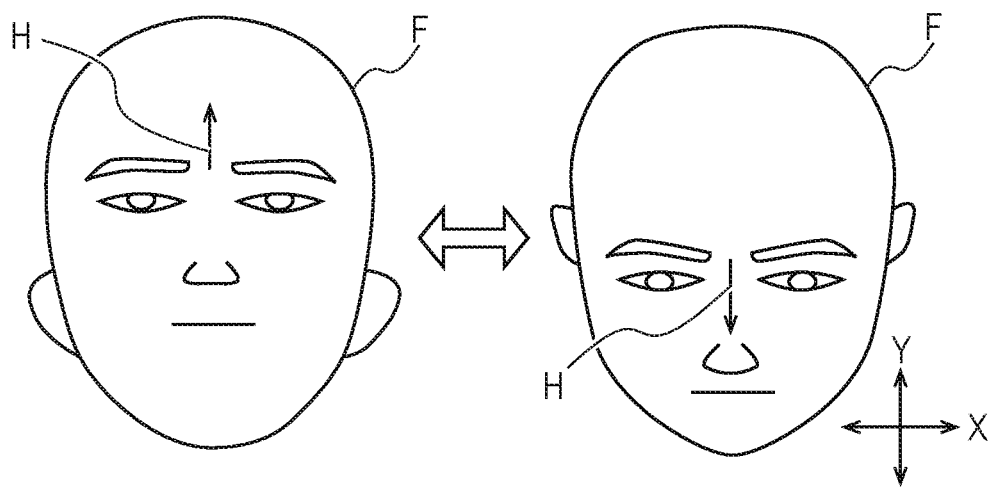
FIG. 6A is a schematic diagram of a face of a subject to be detected.

As another example of suspicious behavior, each of FIG. 5B and FIG. 6A illustrates a state of significant and frequent motion of the face direction H. The subject A is moving the face direction H in the lateral direction in FIG. 5B, and the subject A is moving the face direction H in the vertical direction in FIG. 6A. When trying to steal an item, the subject A may move the face to look around and check the surrounding. Thus, determination whether or not there is a face-shaking state where the subject A moves the face significantly and frequently as illustrated in FIG. 5B and FIG. 6A can be used for detection of a suspicious person.

Figure 5C:
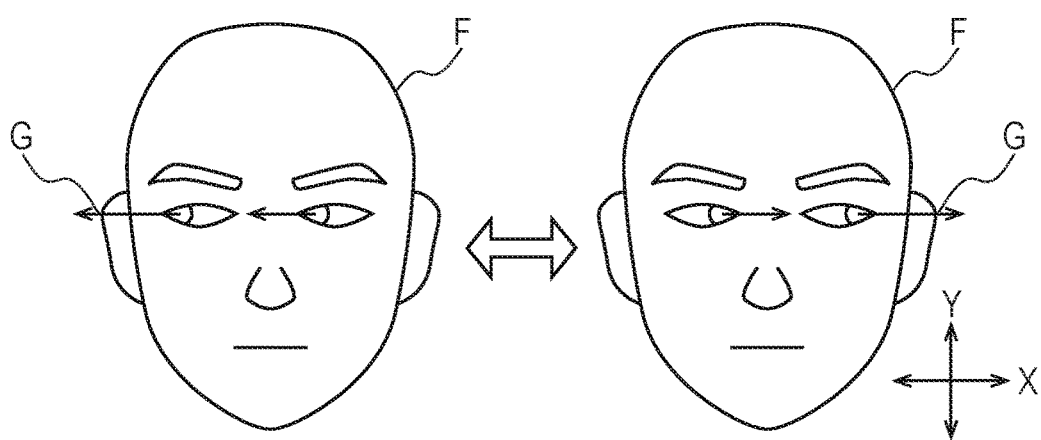
FIG. 5C is a schematic diagram of a face of a subject to be detected.
Figure 6B:
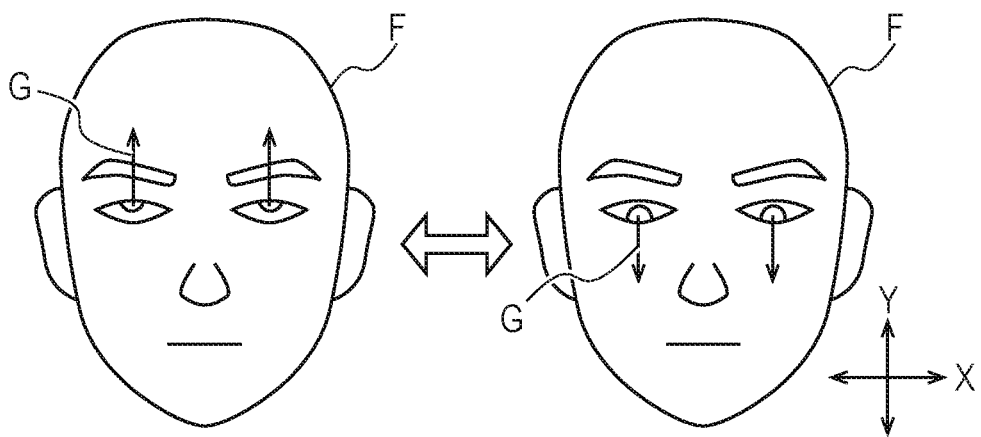
FIG. 6B is a schematic diagram of a face of a subject to be detected.

As another example of suspicious behavior, each of FIG. 5C and FIG. 6B illustrates a state of significant and frequent motion of the eye direction G. The subject A is moving the eye direction G in the lateral direction in FIG. 5C, and the subject A is moving the eye direction G in the vertical direction in FIG. 6B. When trying to steal an item, the subject A may move the line of sight to look around and check the surrounding. Thus, determination whether or not there is an eye-moving state where the subject A moves the line of sight significantly and frequently as illustrated in FIG. 5C and FIG. 6B can be used for detection of a suspicious person.

Note that not only a suspicious person necessarily shows the behavior illustrated in FIG. 5A to FIG. 5C and FIG. 6A to FIG. 6B but also a normal customer or employee may show such behavior. Thus, the suspicious person detection system 100 according to the present example embodiment determines a suspicious person based on a predetermined criterion using environment information on the environment around a subject as described later in addition to the behavior of the subject as illustrated in FIG. 5A to FIG. 5C and FIG. 6A to FIG. 6B.

Figure 7:
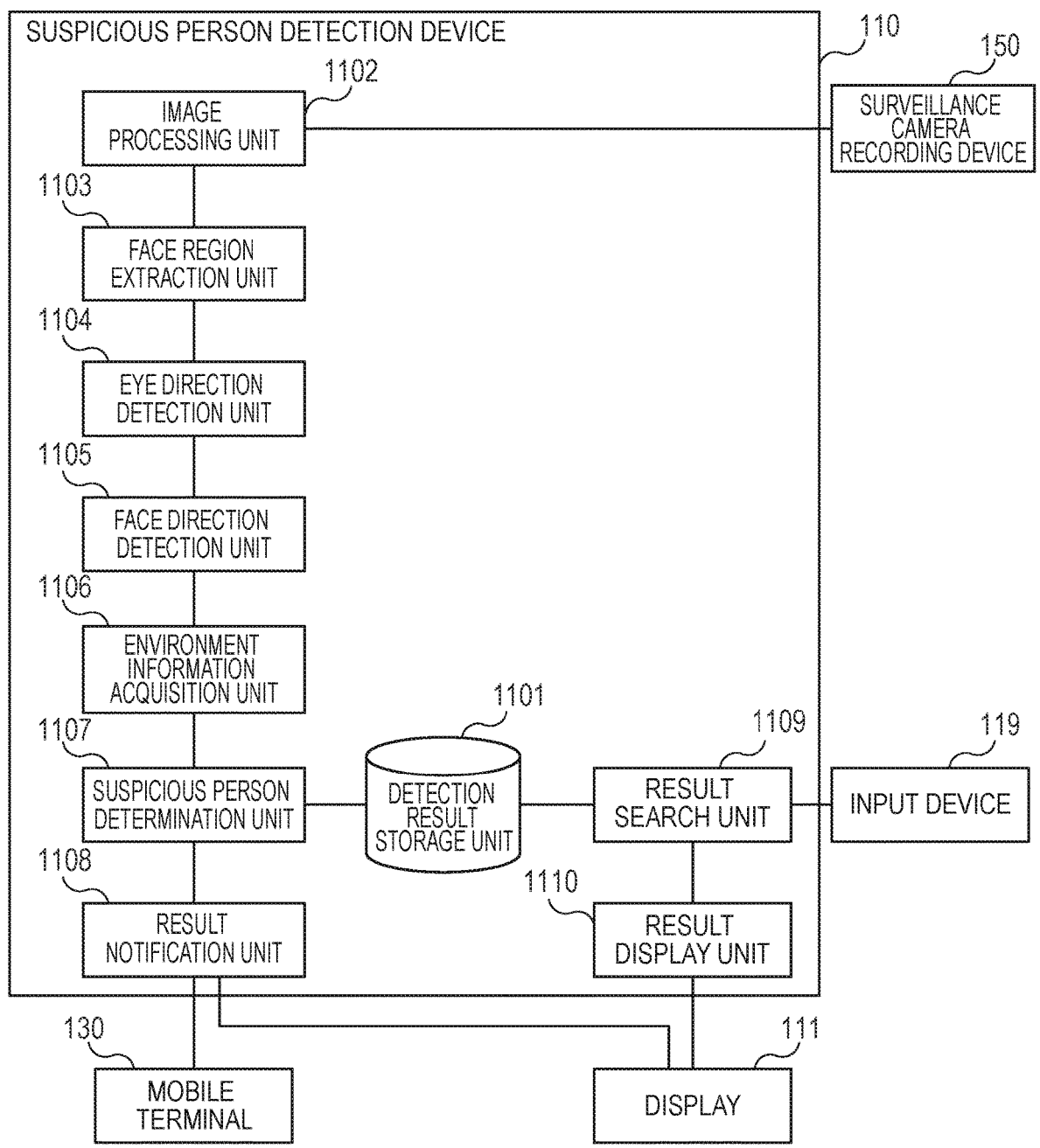
FIG. 7 is a block diagram of a suspicious person detection device according to the first example embodiment.

FIG. 7 is a block diagram of the suspicious person detection device 110 according to the present example embodiment. In FIG. 7, lines between blocks indicate main flows of data, and there may be other data flow than is illustrated in FIG. 7. In FIG. 7, each block illustrates a configuration in a unit of function rather than a configuration in a unit of hardware (device).

The suspicious person detection device 110 includes a detection result storage unit 1101, an image processing unit 1102, a face region extraction unit 1103, an eye direction detection unit 1104, a face direction detection unit 1105, an environment information acquisition unit 1106, a suspicious person determination unit 1107, a result notification unit 1108, a result search unit 1109, and a result display unit 1110. In the suspicious person detection device 110, the image processing unit 1102, the face region extraction unit 1103, the eye direction detection unit 1104, the face direction detection unit 1105, the environment information acquisition unit 1106, the suspicious person determination unit 1107, the result notification unit 1108, the result search unit 1109, and the result display unit 1110 are stored in the memory 113 as programs executable by the processor 112, respectively. That is, when performing a suspicious person detection method according to the present example embodiment, the processor 112 functions as the image processing unit 1102, the face region extraction unit 1103, the eye direction detection unit 1104, the face direction detection unit 1105, the environment information acquisition unit

1106, the suspicious person determination unit 1107, the result notification unit 1108, the result search unit 1109, and the result display unit 1110. At least some of these functions may be implemented as an electric circuit rather than a program. Further, the detection result storage unit 1101 is a part of the memory 113 or the storage device 114. That is, when performing the suspicious person detection method according to the present example embodiment, the memory 113 or the storage device 114 functions as the detection result storage unit 1101.

The image processing unit 1102 acquires an image that is a moving image file recorded in the surveillance camera recording device 150 and divides it into images that are static image files. Specifically, the image processing unit 1102 divides a moving image file on a frame basis and thereby generates images that are static image files. The image processing unit 1102 may acquire a moving image file which is being recorded by the surveillance camera recording device 150 at any time on a predetermined time basis (for example, every second) or may collectively acquire moving image files which have already been recorded by the surveillance camera recording device 150. Furthermore, the image processing unit 1102 may perform any image processing such as noise reduction, brightness adjustment, contrast adjustment, or the like on an image. The image processing unit 1102 holds the acquired image in the memory 113 or the storage device 114.

Subsequent processes may be performed on images of all the frames or may be performed on images of frames that are reduced on a predetermined number basis in accordance with the processing speed of a computer and a required accuracy. Further, in the subsequent processes, an image that is a moving image file may be used without generating images that is static image files. In such a case, subsequent face region extraction, eye direction detection, face direction detection, environment information acquisition, and suspicious person determination are performed with each frame in the moving image file being defined as one image.

The face region extraction unit 1103 extracts a region including a face of a person by using any method from an image acquired from the image processing unit 1102. For example, the face region extraction unit 1103 acquires luminance of each pixel of the image acquired by the image processing unit 1102 and determines, as a face region, a set of pixels in which the luminance of neighboring pixels is greater than a predetermined threshold. The face region extraction unit 1103 holds the position of the extracted face region (for example, coordinates of the left end, the right end, the upper end, and the lower end of the face region) in the memory 113 or the storage device 114. Extraction of a face region is not limited to that described here but may be performed by any method that can extract a region including a face of a person from an image. When two or more face regions are extracted from one image, subsequent eye direction detection, face direction detection, and suspicious person determination are performed for each of the face regions.

The face region extraction unit 1103 provides, to each face region, a tracking ID that is an identifier used for tracking a person displayed in the face region. In an image of a frame to be processed, when a face region is detected near the position of a face region extracted in an image of the previous frame, the face region extraction unit 1103 provides the same tracking ID to the face region. When there is no face region corresponding to the image of the previous frame, the face region extraction unit 1103 provides a new tracking ID to a face region of an image of a frame to be processed. Thereby, after a face of a person was detected and until the face of the person is no longer detected, a face region in which the same person is likely to be included is tracked in a temporal manner, and scores may be accumulated.

To generate a tracking ID, the face region extraction unit 1103 may use any face recognition technology to recognize a person displayed in a face region. That is, the face region extraction unit 1103 provides the same tracking ID to a face region in which the same person identified by using a face recognition technology is displayed. Thereby, tracking can be continued even when a face of a person was no longer detected and then a face of the same person is again detected.

The eye direction detection unit 1104 extracts an eye direction by using any method from a face region extracted by the face region extraction unit 1103. For example, the eye direction detection unit 1104 acquires the positions of pupils of both eyes by using template matching from a face region extracted by the face region extraction unit 1103. The eye direction detection unit 1104 then calculates the direction of the line of sight for each of both the eyes based on the relative position of a pupil to a predetermined reference point on a face of a person. The predetermined reference point may be a position of a Purkinje image that is a light reflection point on a cornea, or an inner canthus, or the like, for example. The eye direction detection unit 1104 calculates the eye direction by using the relative position of a pupil to a predetermined reference point in a face region based on a table illustrating a pre-recorded relationship between the relative position of a pupil to a predetermined reference point and the eye direction. The table indicating the relationship between a relative position of a pupil and an eye direction is determined through an experiment or a simulation in advance. The eye direction detection unit 1104 holds the detected eye direction in the memory 113 or the storage device 114. Detection of the eye direction is not limited to that illustrated here but may be performed by using any method that can detect the direction of the line of sight of a subject from an image.

The face direction detection unit 1105 extracts a face direction by using any method from a face region extracted by the face region extraction unit 1103. For example, the face direction detection unit 1105 acquires the positions of both eyes and the position of a nose by using template matching from a face region extracted by the face region extraction unit 1103. The face direction detection unit 1105 then defines a line connecting the middle point of both the eyes to the position of the nose as a center line of the face and calculates the ratio of the distance from the center line to the left end of a face region and the distance from the center line to the right end of the face region. The face direction detection unit 1105 then calculates a lateral face direction by using the ratio of the left and the right in the face region based on a table indicating a pre-recorded relationship between a lateral ratio and a face direction. The table indicating the relationship between a lateral ratio and a face direction is determined through an experiment or a simulation in advance. Similarly, the face direction detection unit 1105 uses the position of a component of a face to calculate the face direction in the vertical direction. For example, a line connecting the positions of both eyes is defined as a horizontal line of the face, and the ratio of the distance from the horizontal line to the upper end of a face region and the distance from the horizontal line to the lower end of the face region is calculated. The face direction detection unit 1105 then calculates a vertical face direction by using the vertical ratio in a face region based on a table indicating a pre-recorded relationship between a vertical ratio and a face direction. The face direction detection unit 1105 holds the detected face direction in the memory 113 or the storage device 114. Detection of the face direction is not limited to that illustrated here but may be performed by using any method that can detect the orientation of a face of a subject from an image.

The environment information acquisition unit 1106 acquires environment information on an environment around a face region extracted by the face region extraction unit 1103. The environment information in the present example embodiment is information indicating arrangement of an object around a person included in a face region, that is, information indicating a region or a position where an object other than a person is located. For example, in a retail industry, the environment information is information indicating a region or a position where the store shelf C used for displaying items as illustrated in FIG. 3A and FIG. 3B is located. Further, in a logistics industry, the environment information is information indicating a region or a position where a belt conveyer or a cargo used for transporting items is located.

The environment information acquisition unit 1106 may automatically detect environment information from an image acquired by the image processing unit 1102. Typically, an object arranged around a person does not move. Thus, the environment information acquisition unit 1106 may acquire, as environment information, a region which has not moved for a predetermined time period or longer except a background in an image captured by a single camera. The background can be identified as a region having a predetermined color. Further, the environment information acquisition unit 1106 may recognize an object other than a person in an image by an object recognition technology using template matching, or the like and acquire a region in which the object is displayed as environment information.

As another method, the environment information acquisition unit 1106 may acquire, as environment information, a designated region recorded in the storage device 114 in advance. In this case, a range of a region to be identified as an object other than a person within an image captured by a single camera is designated by the input device 119 and recorded in the storage device 114 in advance. The environment information acquisition unit 1106 then reads and acquires, as environment information, the range of the region to be identified as an object within an image from the storage device 114.

As yet another method, the environment information acquisition unit 1106 may acquire a map of object arrangement (that is, a set of positions) recorded in the storage device 114 in advance as environment information. In this case, a map including at least object arrangement in a range captured by a camera is recorded in the storage device 114 in advance. The environment information acquisition unit 1106 then reads and acquires a map indicating object arrangement as environment information from the storage device 114. A method of acquiring environment information indicating arrangement of an object other than a subject is not limited to that illustrated here, and any method may be used.

The suspicious person determination unit 1107 performs determination of a suspicious person based on the eye direction and the face direction detected by the eye direction detection unit 1104 and the face direction detection unit 1105 and the environment information acquired by the environment information acquisition unit 1106. The suspicious person determination unit 1107 performs three types of determination based on the eye direction and the face direction of a face region to be determined and the environment information and accumulates scores based on the determination. The score is a value representing the degree of suspiciousness of a face region to be determined, and the result notification unit 1108 changes the score in accordance with the result of determination described below. In the present example embodiment, a higher score is set for a higher degree of suspiciousness, and a predetermined value is added to the score when the determination result from the result notification unit 1108 indicates suspicious behavior. In contrast, a lower score may be set for a higher degree of suspiciousness, and a predetermined value may be subtracted from the score when the determination result from the result notification unit 1108 indicates suspicious behavior.

[Mismatch Determination]

The suspicious person determination unit 1107 determines that a face region to be determined is in the mismatch state when the difference between the eye direction G and the face direction H is larger than a predetermined threshold as illustrated in FIG. 5A and when the face direction H is oriented to an object other than a person. Specifically, first, the suspicious person determination unit 1107 determines whether or not the face direction H is oriented to at least one object indicated by environment information acquired by the environment information acquisition unit 1106 (that is, the position of an object). A state where a person faces an object can be determined by an angle at which the face direction H enters a region of the object indicated by environment information within an image. That is, an incident angle of a face direction to an object region is larger when a face of a person fully faces the object, and the incident angle is smaller when the face of the person does not face the object at all. Thus, when an angle at which the face direction H enters a region of an object is larger than or equal to a predetermined value, it is determined that the person faces the object. The suspicious person determination unit 1107 calculates an angle difference (absolute value) relative to the X-direction of a face region and an angle difference (absolute value) relative to the Y-direction as the difference between the eye direction G and the face direction H, respectively. In the present example embodiment, the X-direction is defined as the horizontal direction (lateral direction) of an image including a face region, and the Y-direction is defined as the perpendicular direction (vertical direction) of the image including the face region. Other tow directions within an image including a face region may be used without being limited to the X-direction and the Y-direction. Further, when an angle difference relative to the X-direction is larger than a threshold for the X-direction or an angle difference relative to the Y-direction is larger than a threshold for the Y-direction and, furthermore, when the face direction H faces an object indicated by environment information, the suspicious person determination unit 1107 determines that a face region to be determined is in the mismatch state. To determine the difference between the eye direction G and the face direction H, these directions may be directly compared without being divided into the X-direction and the Y-direction of a face region. Further, any method that can quantitatively determine the difference between the eye direction G and the face direction H may be used.

When determining that a face region to be determined is in the mismatch state, the suspicious person determination unit 1107 adds a predetermined addition score value to an accumulated score of the tracking ID provided to the face region. The accumulated score is used as a condition to perform notification performed by the result notification unit 1108 described later.

The suspicious person determination unit 1107 may use different addition score values for respective thresholds. For example, a first addition score value is used when the difference between the eye direction G and the face direction H is larger than a first threshold and smaller than or equal to a second threshold, and a second addition score value is used when the difference between the eye direction G and the face direction H is larger than the second threshold. With such a configuration, the accumulated score can be finely controlled in accordance with the level of the difference between the eye direction G and the face direction H, and notification can be properly performed.

As the addition score value and the threshold for the difference between the eye direction G and the face direction H, values defined in advance through an experiment or a simulation may be used or values input by the input device 119 may be used, respectively.

[Face-Shaking Determination]

The suspicious person determination unit 1107 determines that a face region to be determined is in the face-shaking state when the face direction H is moved significantly and frequently to satisfy a predetermined reference as illustrated in FIG. 5B and FIG. 6A and, furthermore, when the center of motion of the face direction H is oriented to an object other than a person. Specifically, the suspicious person determination unit 1107 acquires the face direction H from a predetermined time to the time of capturing a face region to be determined. Next, the suspicious person determination unit 1107 calculates the motion angle (absolute value) relative to the X-direction and the motion angle (absolute value) relative to the Y-direction of the face direction H in a temporal manner, respectively. In the present example embodiment, the X-direction is defined as the horizontal direction (lateral direction) of an image including a face region, and the Y-direction is defined as the perpendicular direction (vertical direction) of the image including the face region. Other two directions within an image including a face region may be used without being limited to the X-direction and the Y-direction. Further, the suspicious person determination unit 1107 calculates the number of times that certain motion occurs from a predetermined time to the time of capturing a face region to be determined, and the certain motion is such that the motion angle relative to the X-direction is larger than a threshold for the X-direction or the motion angle relative to the Y-direction is larger than a threshold for the Y-direction and the center of the motion is directed to at least one object indicated by environment information acquired by the environment information acquisition unit 1106. The suspicious person determination unit 1107 determines that a face region to be determined is in the face-shaking state when the calculated number of times is greater than a predetermined threshold. To determine the motion of the face direction H, the motion distance of an end of a line representing the face direction H on a face region may be used instead of the angle of the face direction H. Further, any method that can quantitively determine motion of the face direction H may be used.

When determining that a face region to be determined is in the face-shaking state, the suspicious person determination unit 1107 adds a predetermined addition score value to an accumulated score of the tracking ID provided to the face region. As a threshold for the motion angle of the face direction H, a time period, the number of times, and an addition score value, values defined in advance through an experiment or a simulation may be used or values input by the input device 119 may be used, respectively.

[Eye-Moving Determination]

The suspicious person determination unit 1107 determines that a face region to be determined is in the eye-moving state when the eye direction G is moved significantly and frequently to satisfy a predetermined reference as illustrated in FIG. 5C and FIG. 6B and, furthermore, when the face direction H is oriented to an object other than a person. Specifically, first, the suspicious person determination unit 1107 determines whether or not the face direction H is directed to at least one object indicated by environment information acquired by the environment information acquisition unit 1106. The suspicious person determination unit 1107 acquires the eye direction G from a predetermined time to the time of capturing a face region to be determined. Next, the suspicious person determination unit 1107 calculates the motion angle (absolute value) relative to the X-direction and the motion angle (absolute value) relative to the Y-direction of the eye direction G in a temporal manner, respectively. In the present example embodiment, the X-direction is defined as the horizontal direction (lateral direction) of an image including a face region, and the Y-direction is defined as the perpendicular direction (vertical direction) of the image including the face region. Other two directions within an image including a face region may be used without being limited to the X-direction and the Y-direction. Further, the suspicious person determination unit 1107 calculates the number of times that certain motion occurs from a predetermined time to the time of capturing a face region to be determined, and the certain motion is such that the motion angle for the X-direction is larger than a threshold for the X-direction or the motion angle for the Y-direction is larger than a threshold for the Y-direction in a state where the face direction H is oriented to at least one object indicated by environment information acquired by the environment information acquisition unit 1106. The suspicious person determination unit 1107 determines that a face region to be determined is in the eye-moving state when the calculated number of times is greater than a predetermined threshold. To determine the motion of the eye direction G, the motion distance of an end of a line representing the eye direction G on a face region may be used instead of the angle of the eye direction G. Further, any method that can quantitively determine motion of the eye direction G may be used.

When determining that a face region to be determined is in the eye-moving state, the suspicious person determination unit 1107 adds a predetermined addition score value to an accumulated score of the tracking ID provided to the face region. As a threshold for the motion angle of the eye direction G, a time period, the number of times, and an addition score value, values defined in advance through an experiment or a simulation may be used or values input by the input device 119 may be used, respectively.

The suspicious person determination unit 1107 may perform the whole or a part of the mismatch determination, the face-shaking determination, and the eye-moving determination. Further, the suspicious person determination unit 1107 may perform other determination that can determine a suspicious person based on an eye direction, a face direction, and environment information.

As the eye direction used for determination by the suspicious person determination unit 1107, an average value of respective eye directions of both eyes may be used, or an eye direction of one of both eyes may be used. Alternatively, the suspicious person determination unit 1107 may perform determination on both eyes, respectively.

As discussed above, the suspicious person detection device 110 according to the present example embodiment performs determination of suspicious behavior based on environment information indicating arrangement of one or more objects around a subject in addition to the face direction and the eye direction of the subject. This enables reduced erroneous detection and more accurate determination of a suspicious person compared to determination based on only the face direction and the eye direction.

The suspicious person determination unit 1107 records the determined state and score as a detection result in a predetermined form in the detection result storage unit 1101 together with information output from the face region extraction unit 1103, the eye direction detection unit 1104, and the face direction detection unit 1105. FIG. 8 is a schematic diagram of an exemplary detection result 1101a recorded in the detection result storage unit 1101. The detection result 1101a may be recorded as one or a plurality of data files or may be recorded as one or a plurality of databases. The detection result 1101a includes capturing time of an image acquired by the image processing unit 1102, a camera ID used for identifying a camera that has captured an image, a face image obtained by cutting out a position at and near a face region extracted by the face region extraction unit 1103, or a tracking ID used for tracking a subject of the face region. The position of a face region is represented by the X-coordinates of the left end and the right end of a face and the Y-coordinates of the upper end and the lower end thereof.

Further, the detection result 1101a includes eye positions and an eye direction detected by the eye direction detection unit 1104 at the time of interest and a face direction detected by the face direction detection unit 1105. The eye position is represented by the X-coordinate and Y-coordinate of the pupil for each of both eyes. The eye direction is represented by two angles of an azimuth angle θ and an elevation angle φ for each of both eyes. Instead, an eye direction may be represented by an average value of eye directions of both eyes. A face direction is represented by three angles of a pan angle, a tilt angle, and a roll angle. A face position, eye positions, an eye direction, and a face direction may be represented by any scheme that can define the position or the direction, respectively, without being limited to those illustrated here. Furthermore, the detection result 1101a includes a state determined by the suspicious person determination unit 1107 and an accumulated score at the time of interest. The form of the detection result 1101a illustrated here is an example and may be recorded in any form.

The result notification unit 1108 notifies a surveillant of a detection result determined by the suspicious person determination unit 1107 by using at least one of the display 111 connected to the suspicious person detection device 110 and the mobile terminal 130 communicating with the suspicious person detection device 110. For example, a surveillant may be a shop clerk when monitoring wrongdoing of a customer and may be a manager when monitoring wrongdoing of an employee. A specific notification method will be described later by using FIG. 9A, FIG. 9B, and FIG. 10.

The result search unit 1109 receives a condition input by a surveillant from the input device 119 connected to the suspicious person detection device 110 and searches the detection result storage unit 1101 to acquire a detection result which matches the condition. The result display unit 1110 displays the detection result searched for by the result search unit 1109 on the display 111 connected to the suspicious person detection device 110. A specific display method of a detection result will be described later by using FIG. 11.

Figure 9A:
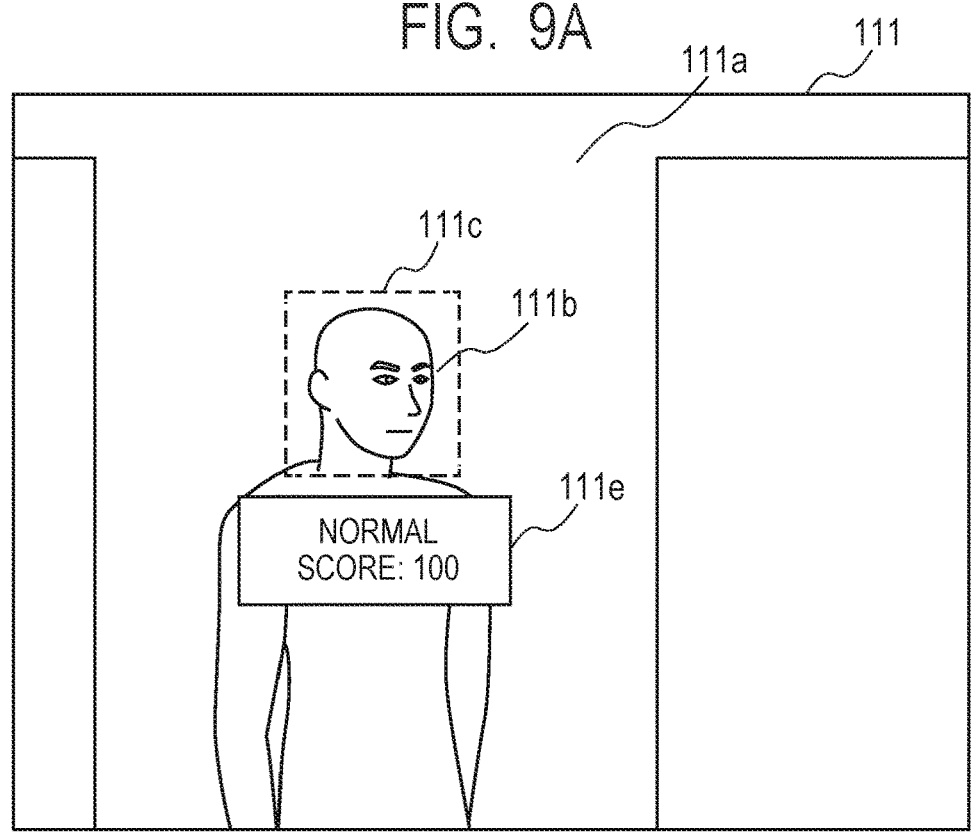
FIG. 9A is a front view of a display displaying a notification of a detection result according to the first example embodiment.
Figure 9B:
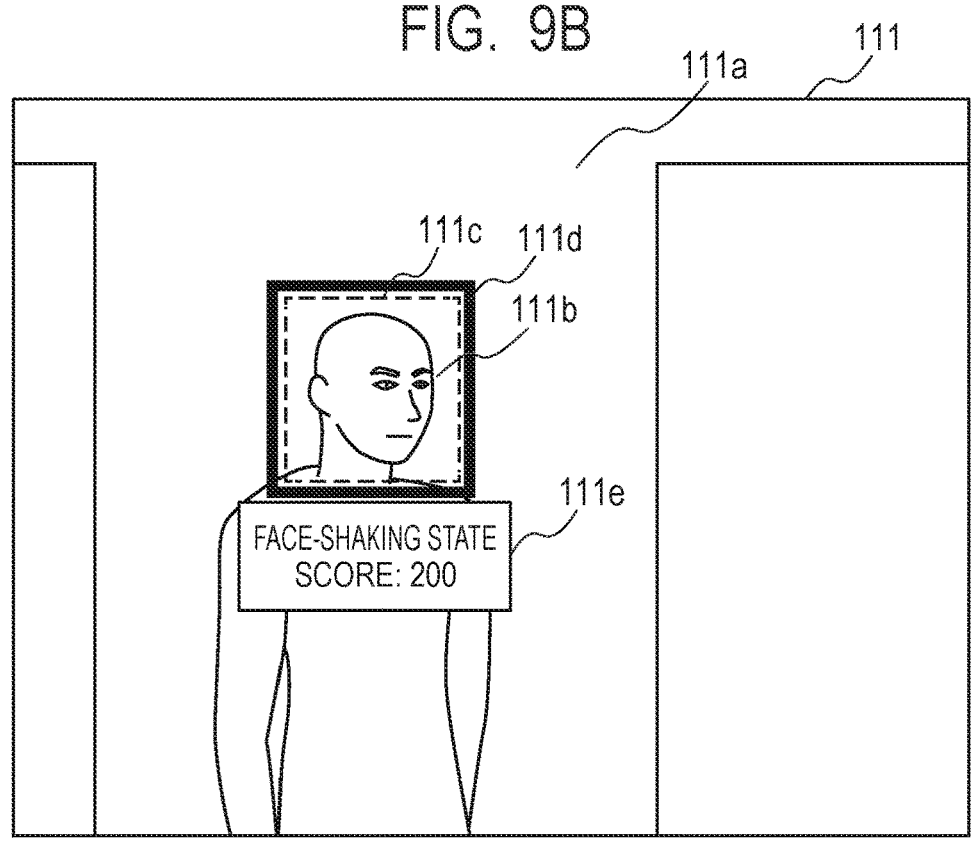
FIG. 9B is a front view of a display displaying a notification of a detection result according to the first example embodiment.

FIG. 9A and FIG. 9B are front views of the display 111 displaying a notification of a detection result from the result notification unit 1108. The result notification unit 1108 displays the notification screen 111a on the display 111. The notification screen 111a includes a detection result detected by the suspicious person determination unit 1107 together with an image captured by the surveillance camera recording device 150. The image included in the notification screen 111a may be any of a moving image and a static image.

As illustrated in FIG. 9A, the result notification unit 1108 displays a superimposed first frame 111c so as to surround a face region 111b extracted by the face region extraction unit 1103 on an image being displayed. Further, the result notification unit 1108 displays a superimposed state indication 111e near the face region 111b extracted by the face region extraction unit 1103 on the image being displayed. The state indication 111e includes a text representing a state determined by the suspicious person determination unit 1107 and an accumulated score. When a face region corresponds to at least one of the mismatch state, the face-shaking state, and the eye-moving state as a state included in the state indication 111e, the result notification unit 1108 displays a text representing the state, and when a face region corresponds to none of these states, the result notification unit 1108 displays "normal".

When a face region corresponds to at least one of the mismatch state, the face-shaking state, and the eye-moving state, the result notification unit 1108 changes the color of the first frame 111c surrounding the face region to perform the first notification indicating to a surveillant that the person included in the face region is showing suspicious behavior. To notify a state of a face region, the appearance such as a transparency level, a line type, a thickness, or the like of the first frame 111c may be changed instead of or in addition to a change of the color of the first frame 111c.

As illustrated in FIG. 9B, when the accumulated score calculated for a face region by the suspicious person determination unit 1107 is larger than a predetermined threshold, the result notification unit 1108 displays a superimposed second frame 111d to surround the face region on the image being displayed and thereby performs a second notification indicating to a surveillant that a person included in a face region is continuously showing suspicious behavior. Thereby, it is possible to notify the surveillant that the likelihood of being a suspicious person is high.

Furthermore, it is desirable that the result notification unit 1108 change the appearance of the second frame 111d, such as a color, a transparency level, a line type, a thickness, or the like, in accordance with the accumulated score of a face region. For example, the result notification unit 1108 displays the second frame 111d such that the transparency level is higher for a smaller accumulated score and the transparency level is lower for a larger accumulated score. Such a configuration can facilitate a surveillant to recognize a face region which has a higher likelihood of being a suspicious person. As a threshold for the accumulated score, values defined in advance through an experiment or a simulation may be used or values input by the input device 119 may be used.

The method of notification performed by the result notification unit 1108 is not limited to the method using the display 111 connected to the suspicious person detection device 110, and an electronic signboard (digital signage), a robot, a speaker, a lamp, or the like installed within a shop may be used. The notification contents may be those targeted to the suspicious person without being limited to those targeted to the surveillant. For example, the result notification unit 1108 may output a message or a voice such as "Shoplifting is a crime" from an electronic signboard, a robot, or a speaker located near a suspicious person determined by the suspicious person determination unit 1107. With such a configuration, precautions against wrongdoing of a suspicious person can be automatically taken, and labor such as questioning or the like by a surveillant can be reduced.

Figure 10:
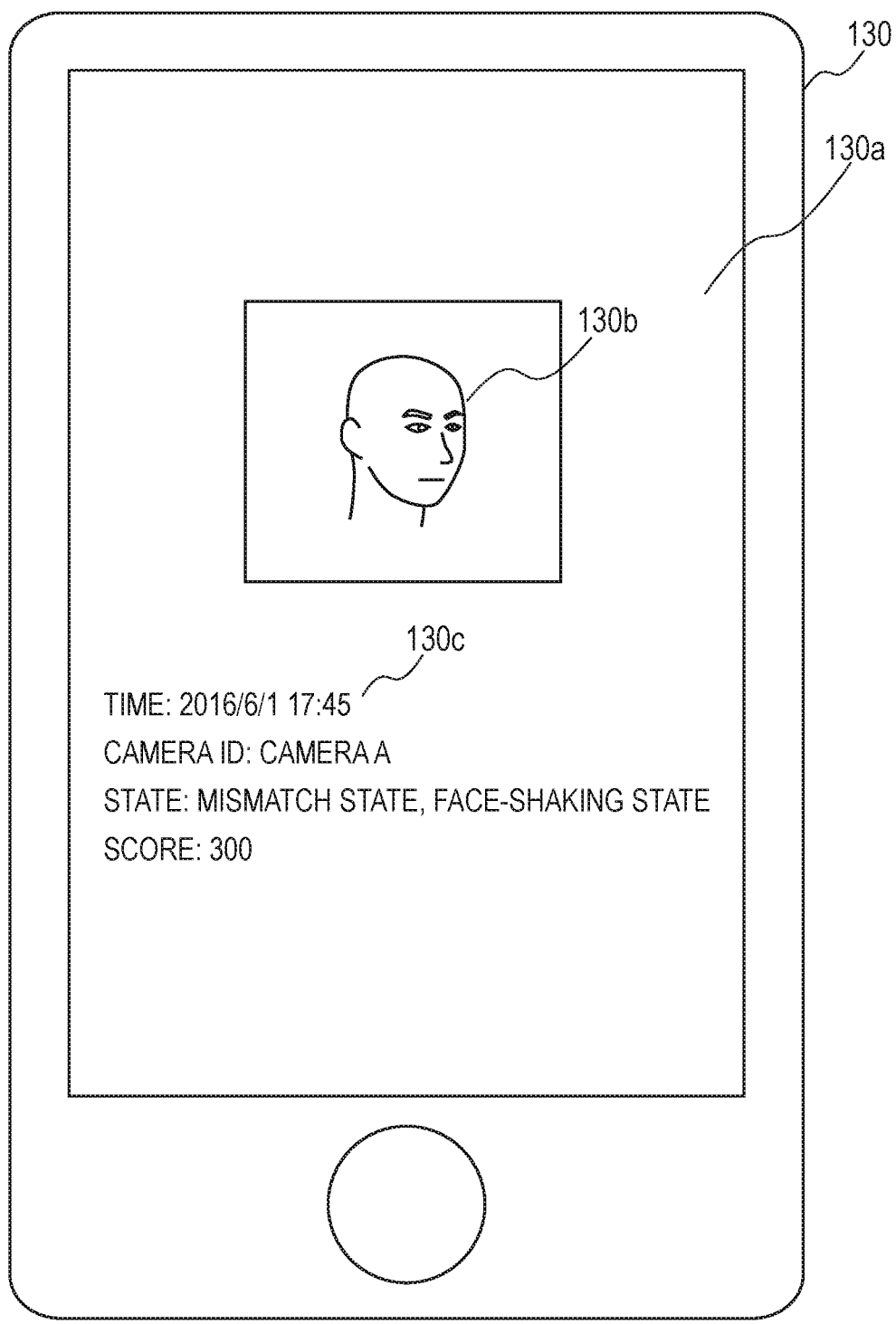
FIG. 10 is a front view of a mobile terminal displaying a notification of a detection result according to the first example embodiment.

FIG. 10 is a front view of the mobile terminal 130 displaying a notification of a detection result from the result notification unit 1108. When the accumulated score calculated for a face region by the suspicious person determination unit 1107 is larger than a predetermined threshold, the result notification unit 1108 transmits information including a detection result for the face region to the mobile terminal 130, and the mobile terminal 130 displays a notification screen 130*a* on the display thereof.

The mobile terminal 130 displays a face region 130*b* extracted by the face region extraction unit 1103 based on information received from the result notification unit 1108. Further, the mobile terminal 130 displays a state indication 130*c* based on information received from the result notification unit 1108. The state indication 130*c* includes capturing time of a face region, a camera ID used for identifying a camera that has captured a face region, a state determined by the suspicious person determination unit 1107, and a text representing an accumulated score. When a face region corresponds to at least one of the mismatch state, the face-shaking state, and the eye-moving state, the mobile terminal 130 displays a text representing the state as a state included in the state indication 130*c*, and when a face region corresponds to none of these states, the mobile terminal 130 displays "normal". Each of the notification screens 111*a* and 130*a* illustrated in FIG. 9 and FIG. 10 is an example, information to be displayed and the display scheme thereof may be changed.

The result notification unit 1108 may select a target for notification, that is, a device to be notified of the notification in accordance with the accumulated score of a face region. For example, the result notification unit 1108 performs notification by using the first mobile terminal 130 when the accumulated score is a first value and performs notification by using the second mobile terminal 130 in addition to the first mobile terminal 130 when the accumulated score is a second value that is larger than the first value. In such a configuration, if a shop manager owns the first mobile terminal 130 and shop clerks own the second mobile terminals 130, it is possible to notify only the shop manager when the accumulated score is small and notify many shop clerks when a person with a high accumulated score who is highly likely to be a suspicious person appears. Not only the mobile terminal 130 but also the display 111 may be selected as the target for notification. Further, the position of a target device for notification may be selected in accordance with the accumulated score. In this case, the result notification unit 1108 performs notification by using the first mobile terminal 130 located near the suspicious person when the accumulated score is a first value and performs notification by using the second mobile terminal 130 located more distant from the suspicious person than the first mobile terminal 130 in addition to the first mobile terminal 130 when the accumulated score is a second value that is larger than the first value.

In the process described above, each comparison scheme between the calculated values from the suspicious person determination unit 1107 and the result notification unit 1108 and respective thresholds is an example, and the comparison scheme may be changed as appropriate in accordance with the definition of the calculated value and the threshold. For example, "larger than or equal to a threshold" may be changed to "larger than a threshold", or the signs of the calculated value and the threshold may be inverted to apply "smaller than or equal to a threshold" or "smaller than a threshold".

Figure 11:
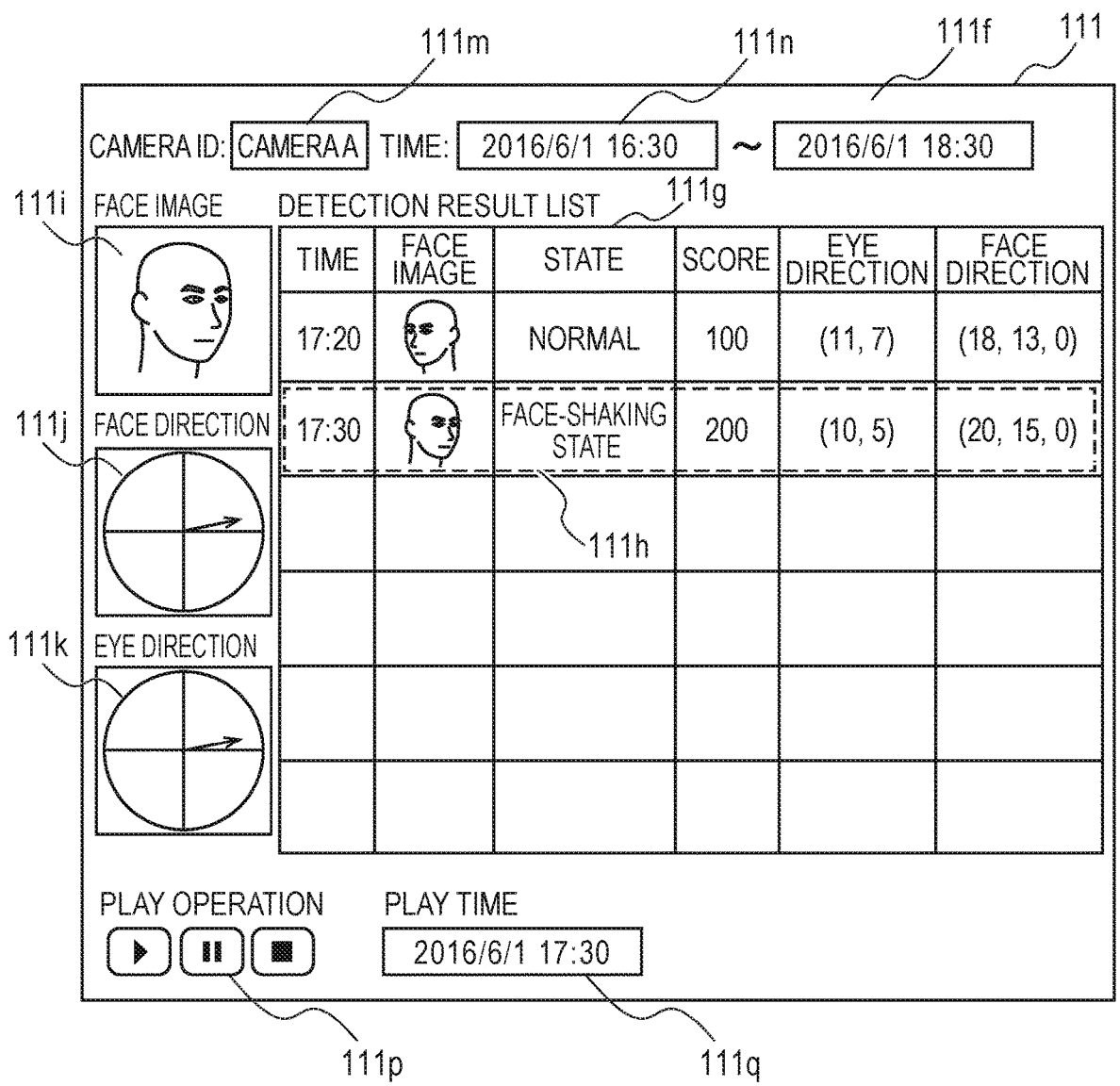
FIG. 11 is a front view of a display displaying a searched detection result according to the first example embodiment.

FIG. 11 is a front view of the display 111 displaying a detection result searched for by the result search unit 1109. The result display unit 1110 displays a result display screen 111*f* on the display 111. The result display screen 111*f* is a screen that displays the searched detection result and accepts input of a search condition from the input device 119.

The result display screen 111*f* includes a camera ID field 111*m* to which a camera ID of a search target can be input, a time field 111*n* to which a time range of a search target can be input, and a detection result list 111*g* that displays the searched detection results. The result search unit 1109 searches the detection result storage unit 1101 for detection results corresponding to a camera ID input in the camera ID field 111*m* and a range of time input in the time field 111*n* by the input device 119. The result display unit 1110 displays detection results searched for by the result searching unit 1109 in the detection result list 111*g* on the display 111. In the detection result list 111*g*, capturing time, an image, a determined state, an accumulated score, an eye direction, and a face direction associated with each face region included in a detection result are displayed. Without being limited to the above, other information related to a face region may be displayed in the detection result list 111*g*.

When one face region is selected through the input device 119, the result display unit 1110 displays a selection frame 111*h* over the information associated with the selected face region. Furthermore, the result display unit 1110 displays the selected face region in a face image filed 111*i*, displays the face direction as an arrow in a face direction field 111*j*, and displays the eye direction as an arrow in an eye direction field 111*k*.

The result display screen 111*f* includes an operating button 111*p* used for play operation and a play time field 111*q* in which time to play can be input. The play time field 111*q* may be input with capturing time of a selected face region or any time input from the input device 119. The operating button 111*p* includes a play button, a pause button, and a stop button, for example. Once the play button is pressed, the result search unit 1109 continuously displays and thereby plays the face region on the face image filed 111*i* from the time of input to the play time field 111*q*. When the pause button is pressed, the result search unit 1109 stops playing the face region at the time during playing, and when the stop button is pressed, the result search unit 1109 sets the time back to the play start time and stops playing the face region.

At the same time as play of a face region, an arrow indicating a face direction is continuously displayed in the face direction field 111*j*, and an arrow indicating an eye direction is continuously displayed in the eye direction field 111*k* in accordance with a face region being played. Instead of the arrow indicating a face direction and an eye direction, points indicating a face direction and an eye direction may be displayed. In this case, the points indicating a plurality of face directions and a plurality of eye directions are displayed in a temporal manner so that the transparency level is lower for closer time to the time during display and the transparency level is higher for older time from the time during display. This enables a surveillant to easily recognize transition of the face direction and the eye direction from the past to the current.

The result display screen 111f illustrated in FIG. 11 is an example, and a search condition that can be input, information to be displayed, and a display scheme may be changed.

Figure 12:
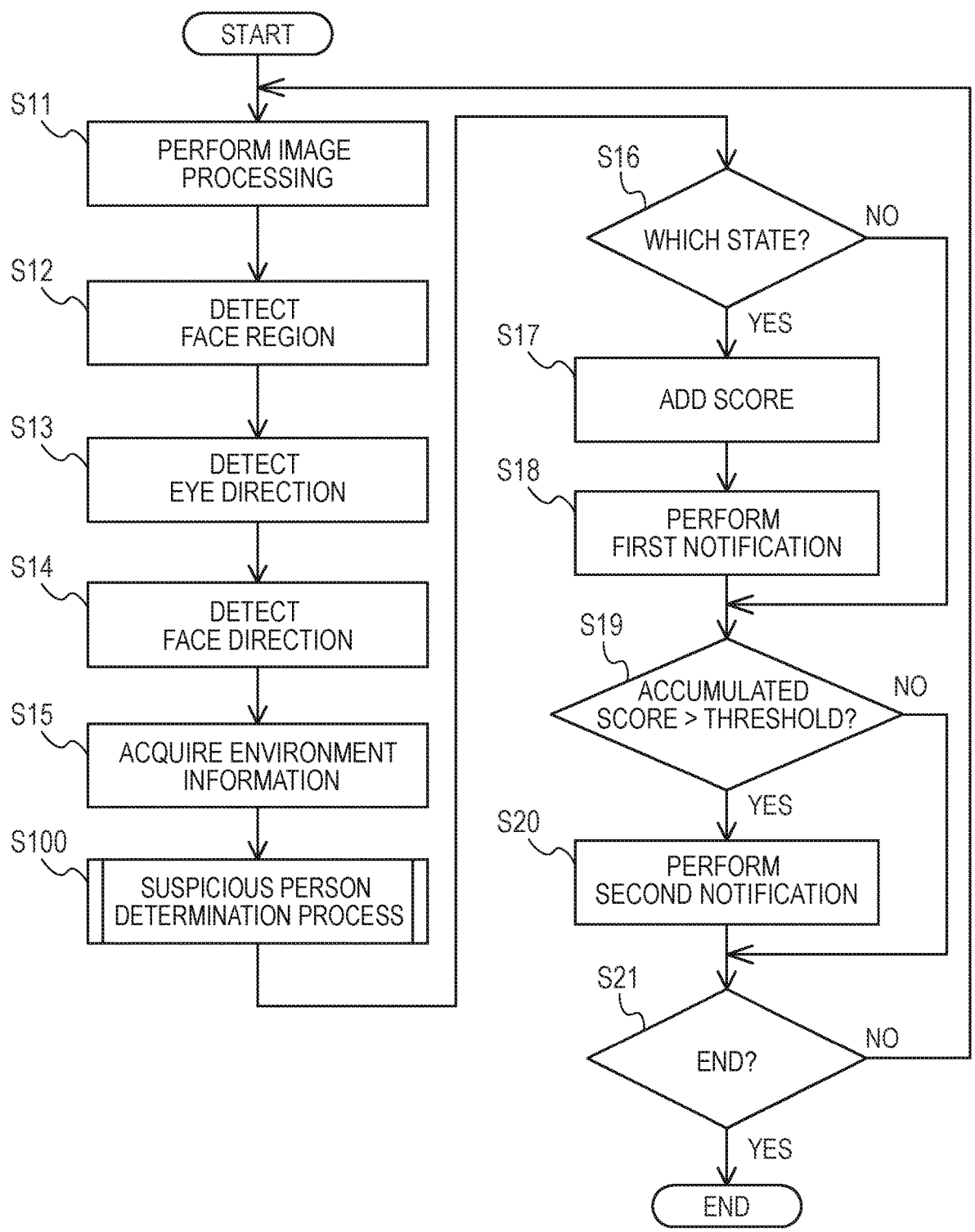
FIG. 12 is a diagram illustrating a flowchart of a suspicious person detection method according to the first example embodiment.

FIG. 12 is a diagram illustrating a flowchart of a suspicious person detection method according to the present example embodiment. The suspicious person detection method is started when a predetermined operation such as press of a button for starting a process on the suspicious person detection device 110 is detected, for example.

First, the image processing unit 1102 acquires an image that is a moving image file recorded in the surveillance camera recording device 150 and divides the image into images that are static image files on a frame basis (step S11). The subsequent process is performed for an image of each frame.

The face region extraction unit 1103 extracts a face region including a face of a person by using the method described above from the image acquired in step S11 (step S12). Further, when there is a face region corresponding to the image of the previous frame, the face region extraction unit 1103 provides the same tracking ID to the extracted face region, otherwise, the face region extraction unit 1103 provides a new tracking ID to the extracted face region. When a plurality of face regions are extracted from an image, the subsequent process is performed on respective face regions to be determined.

The eye direction detection unit 1104 extracts the eye direction by using the method described above from the face region to be determined (step S13). The face direction detection unit 1105 extracts the face direction by using the method described above from the face region to be determined (step S14). The environment information acquisition unit 1106 acquires environment information by using the method described above from the image acquired by step S11 (step S15). Note that steps S13 to S15 may be performed in any order or performed in parallel.

The suspicious person determination unit 1107 uses the eye direction, the face direction, and the environment information acquired in steps S13 to S15 for the face region to be determined to perform determination of a suspicious person by using a suspicious person determination process described later by using FIG. 13 (step S100). The determination of a suspicious person includes the mismatch determination, the face-shaking determination, and the eye-moving determination described above. The suspicious person determination unit 1107 determines which of a mismatch state, a face-shaking state, and an eye-moving state the face region to be determined corresponds to or whether or not the face region to be determined corresponds to none of these states.

If the face region to be determined corresponds to at least one of the states in step S100 (step S16, YES), the suspicious person determination unit 1107 adds a predetermined addition score value associated with the state to the accumulated score of the tracking ID of the face region (step S17). In addition, the result notification unit 1108 uses at least one of the display 111 and the mobile terminal 130 to perform the first notification indicating that a subject included in the face region shows suspicious behavior (step S18). If it is determined that the face region to be determined corresponds to none of the states in step S100 (step S16, NO), steps S17 to S19 are not performed.

If the accumulated score is greater than or equal to a predetermined threshold (step S19, YES), the result notification unit 1108 uses at least one of the display 111 and the mobile terminal 130 to perform the second notification indicating that the subject included in the face region continues to show suspicious behavior (step S20). If the accumulated score is less than the predetermined threshold (step S19, NO), step S20 is not performed.

If a predetermined operation such as press of a button used for terminating the process is performed on the suspicious person detection device 110 (step S21, YES), the suspicious person detection method ends. If no predetermined operation such as press of a button used for terminating the process is performed on the suspicious person detection device 110 (step S21, NO), the process returns to step S11 and repeats the process.

Figure 13:
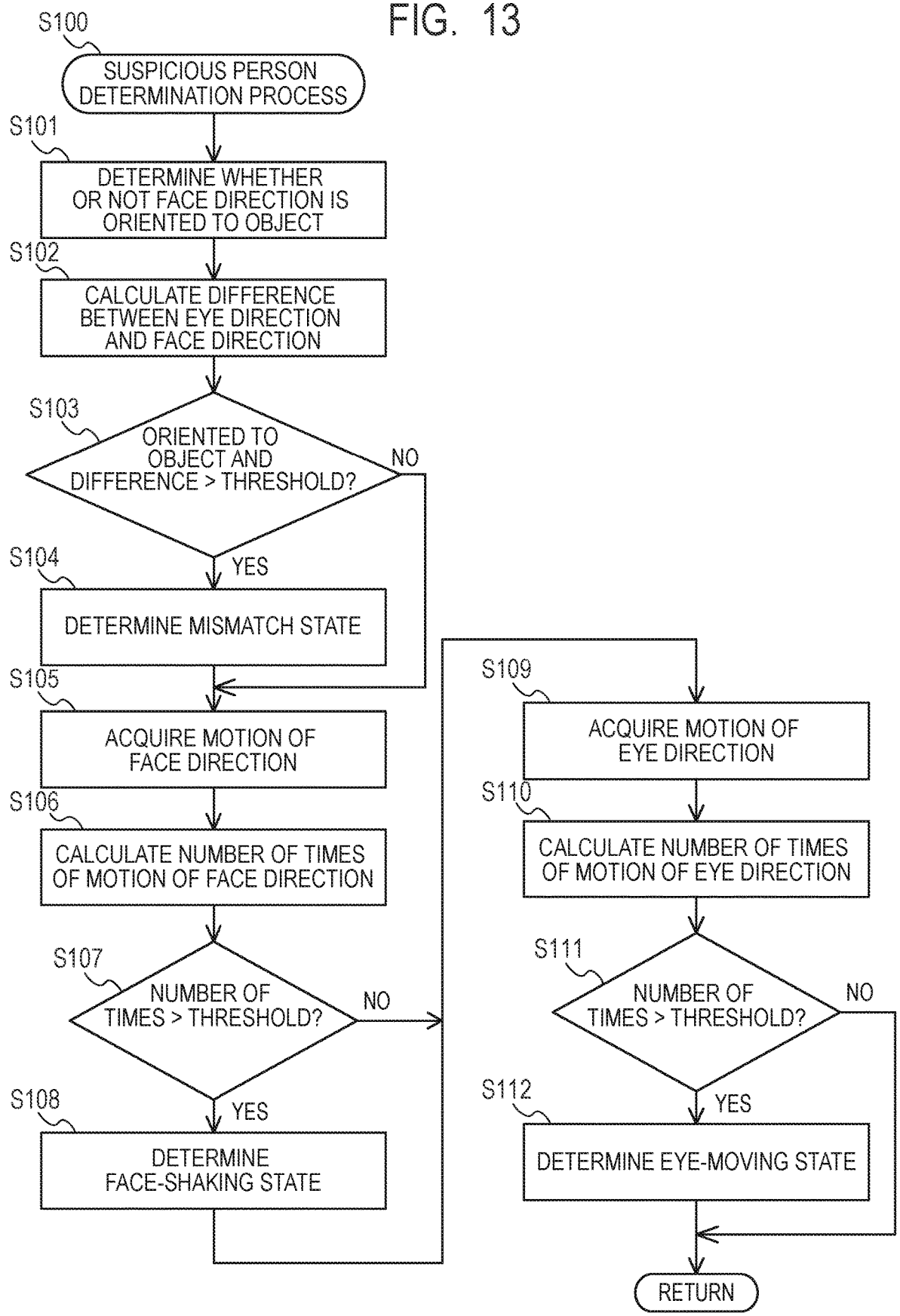
FIG. 13 is a diagram illustrating a flowchart of a suspicious person determination process according to the first example embodiment.

FIG. 13 is a diagram illustrating a flowchart of the suspicious person determination process according to the present example embodiment. The suspicious person determination unit 1107 determines whether or not the face direction H is directed to at least one object indicated by the environment information acquired by step S15 (step S101). Next, the suspicious person determination unit 1107 calculates the difference between the eye direction G and the face direction H (step S102). If the face direction H is oriented to an object and, furthermore, if the difference between the eye direction G and the face direction H is greater than a predetermined threshold (step S103, YES), it is determined that the face region to be determined is in a mismatch state (step S104). Otherwise (step S103, NO), the suspicious person determination unit 1107 does not determine that the face region to be determined is in the mismatch state.

The suspicious person determination unit 1107 acquires motion of the face direction H from a predetermined time to the time of capturing the face region to be determined (step S105). Next, the suspicious person determination unit 1107 calculates the number of times that certain motion occurs from a predetermined time to the time of capturing the face region to be determined, and the certain motion is such that the motion of the face direction H is larger than a predetermined threshold and the center of the motion is oriented to at least one object indicated by environment information acquired in step S15 (step S106). If the number of times of the motion of the face direction H is greater than the predetermined threshold (step S107, YES), it is determined that the face region to be determined is in the face-shaking state (step S108). Otherwise (step S107, NO), the suspicious person determination unit 1107 does not determine that the face region to be determined is in the face-shaking state.

The suspicious person determination unit 1107 acquires motion of the eye direction G from a predetermined time to the time of capturing a face region to be determined (step S109). Next, the suspicious person determination unit 1107 calculates the number of times that certain motion occurs from a predetermined time to the time of capturing the face region to be determined, and the certain motion is such that the motion of the eye direction G is larger than a predetermined threshold in a state where the face direction H is oriented to at least one object indicated by environment information acquired in step S15 (step S110). If the number of times of motion of the eye direction G is larger than the predetermined threshold (step S111, YES), it is determined that the face region to be determined is in the eye-moving state (step S112). Otherwise (step S111, NO), the suspicious person determination unit 1107 does not determine that the face region to be determined is in the eye-moving state.

The mismatch determination of steps S101 to S104, the face-shaking determination of steps S105 to S108, and the eye-moving determination of steps S109 to S112 may be performed in any order or may be performed in parallel.

The processor 112 of the suspicious person detection device 110 is an operating subject of each step (step) included in the suspicious person detection method illustrated in FIG. 12 and FIG. 13. That is, the processor 112 reads a program used for executing the suspicious person detection method illustrated in FIG. 12 and FIG. 13 from the memory 113 or the storage device 114, executes the program to control each unit of the suspicious person detection device 110, and thereby performs the suspicious person detection method illustrated in FIG. 12 and FIG. 13.

The suspicious person detection system 100 according to the present example embodiment performs determination of suspicious behavior based on environment information indicating arrangement of one or more objects around a subject in addition to the face direction and the eye direction of a subject. For example, although a person looking around the left and right of store shelves in order to search for an intended item when walking through an aisle is normal behavior, a use of only the face direction and the eye direction as with the conventional art may cause such erroneous detection that determines the person showing such behavior as a suspicious person. In contrast, in the present example embodiment, since determination is performed by using environment information indicating arrangement of one or more objects such as a store shelf other than a person, erroneous detection as seen in the conventional art can be reduced, and accurate determination of a suspicious person can be performed. Furthermore, the suspicious person detection system 100 according to the present example embodiment controls notification in accordance with the accumulated score added for each suspicious behavior, and therefore can perform notification only when suspicious behavior is continuously performed or can change the form of notification. This enables a surveillant to focus on a person who is highly likely to be a suspicious person.

Second Example Embodiment

In the present example embodiment, in addition to an eye direction, a face direction, and environment information, motion information indicating the presence or absence of motion of a subject is used to perform determination of a suspicious person and notification. The configuration of the suspicious person detection system 100 according to the present example embodiment is the same as that of the first example embodiment, and a method of determination of a suspicious person and notification is different.

Figure 14A:
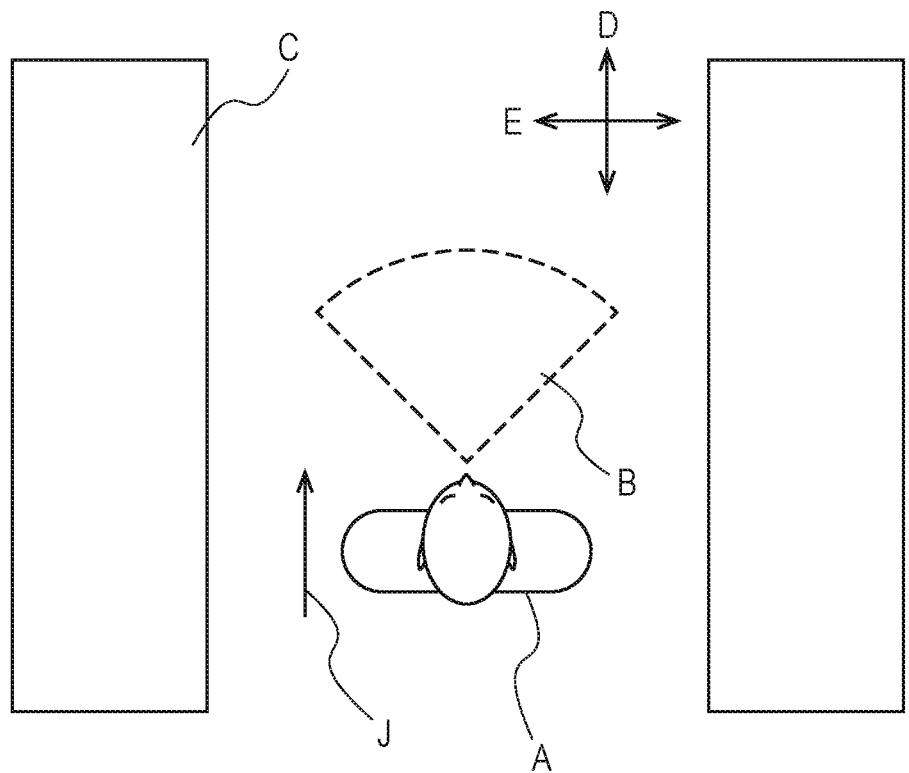
FIG. 14A is a schematic diagram illustrating a motion direction of a subject to be detected.
Figure 14B:
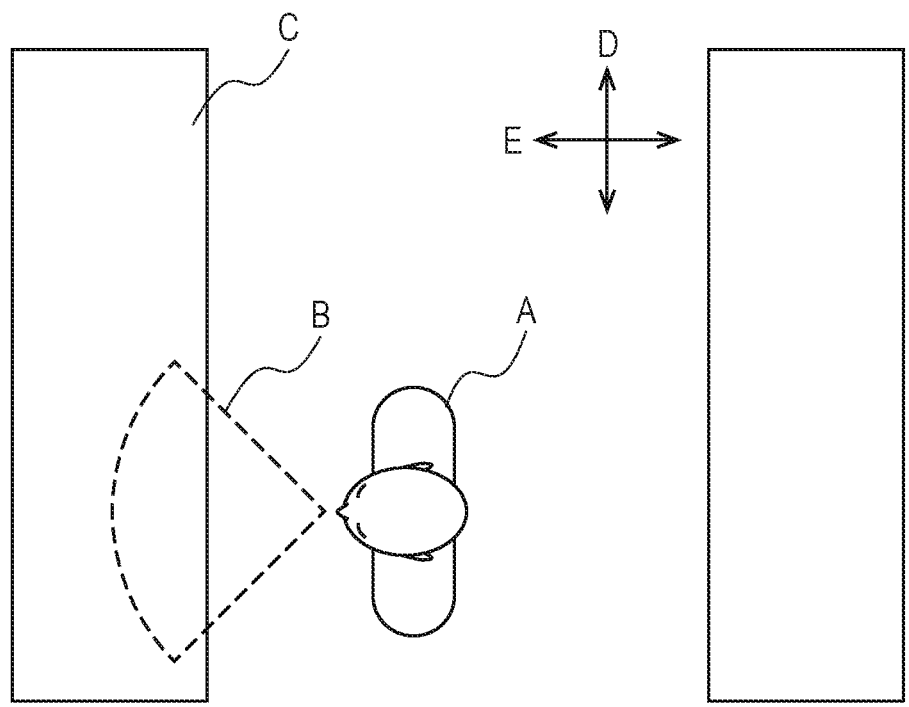
FIG. 14B is a schematic diagram illustrating a motion direction of a subject to be detected.

FIG. 14A and FIG. 14B are schematic diagrams illustrating a motion direction of the subject A in suspicious person detection. Definitions used when viewing FIG. 14A and FIG. 14B are the same as those of FIG. 3A and FIG. 3B. When the subject A is moving in a moving direction J as illustrated in FIG. 14A, it can be recognized that the subject A is simply moving to the store shelf C on which an intended item is placed. On the other hand, when the subject A does not move as illustrated in FIG. 14B, it can be recognized that the subject A has already reached the store shelf C on which an intended item is placed. In such a state, an action of orienting the line of sight to the aisle direction D while orienting the face to the item direction E or an action of significantly and frequently moving the face or the line of sight is considered as suspicious behavior.

Figure 15:
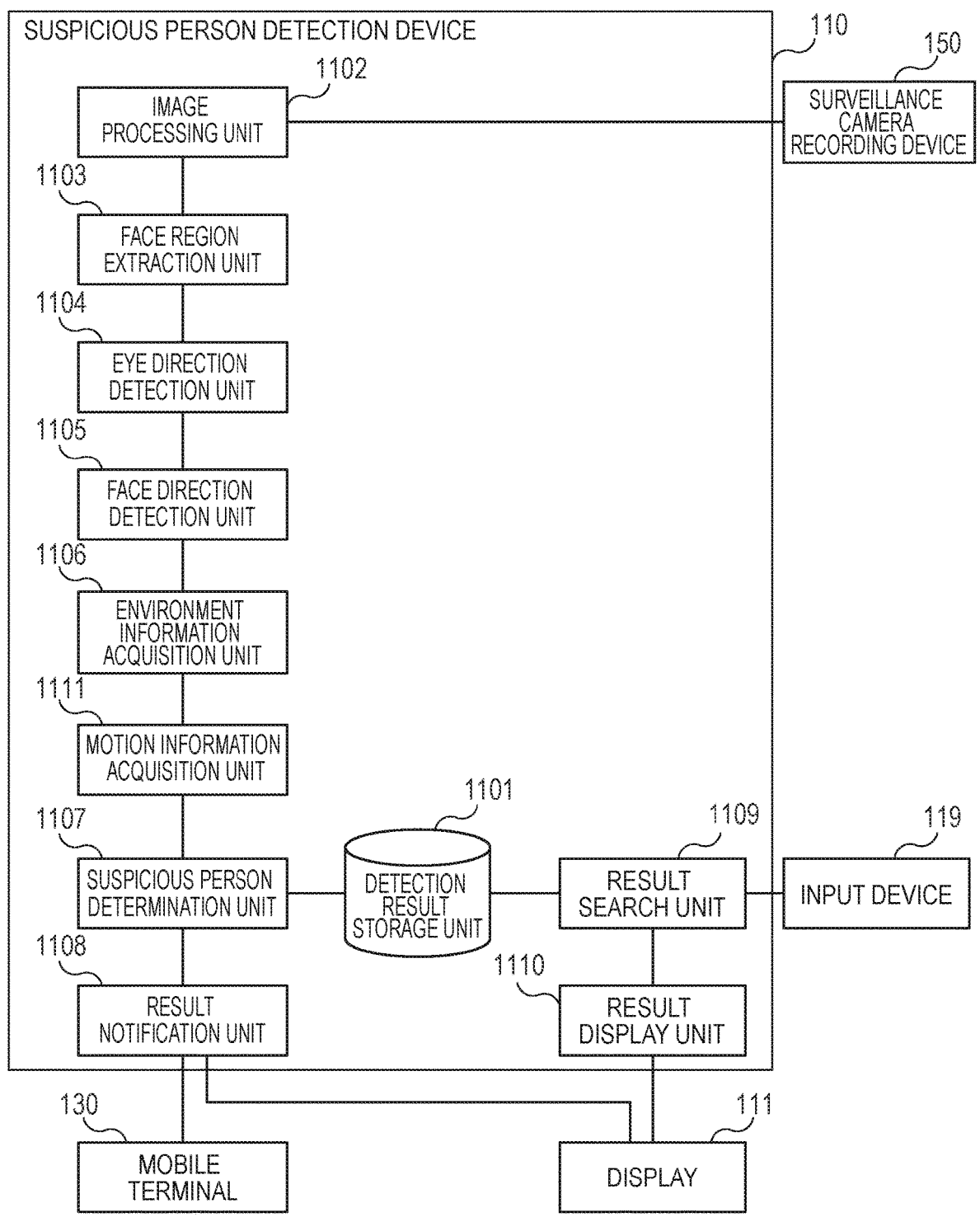
FIG. 15 is a block diagram of a suspicious person detection device according to a second example embodiment.

FIG. 15 is a block diagram of the suspicious person detection device 110 according to the present example embodiment. The suspicious person detection device 110 according to the present example embodiment has a motion information acquisition unit 1111 in addition to the components of FIG. 7. The motion information acquisition unit 1111 acquires information as to whether or not a subject included in a face region extracted by the face region extraction unit 1103 is moving. Specifically, the motion information acquisition unit 1111 calculates whether or not the position of the face region extracted by the face region extraction unit 1103 has changed from the position of the corresponding face region in the previous frame. If the position has changed, the motion information acquisition unit 1111 determines that the subject included in the face region is moving, otherwise, the motion information acquisition unit 1111 determines that the subject included in the face region is not moving.

In the present example embodiment, the suspicious person determination unit 1107 further uses motion information in the mismatch determination, the face-shaking determination, and the eye-moving determination. Specifically, it is determined that a face region to be determined is in the mismatch state when the difference between the eye direction G and the face direction H is greater than a predetermined threshold, when the face direction H is oriented to an object other than a person, and, furthermore, when no motion is determined by the motion information acquisition unit 111. Further, the suspicious person determination unit 1107 determines that the face region to be determined is in the face-shaking state of moving the face direction H significantly and frequently to satisfy a predetermined criterion, when the center of motion of the face direction H is oriented to an object other than a person, and, furthermore, when no motion is determined by the motion information acquisition unit 1111. Further, the suspicious person determination unit 1107 determines that the face region to be determined is in the eye-moving state of moving the eye direction G significantly and frequently to satisfy a predetermined criterion, when the face direction H is oriented to an object other than a person, and furthermore when no motion is determined by the motion information acquisition unit 1111.

The use of the motion information in determination of a suspicious person as discussed above can reduce a situation that the subject happens to face the direction of the store shelf or the like and this is erroneously detected as suspicious behavior, and more accurate determination of a suspicious person can be performed.

As another method, the result notification unit 1108 may select whether or not to perform notification based on the motion information. In this case, the result notification unit 1108 performs the first notification and the second notification described above by using the display 111 or the mobile terminal 130 only when it is determined by the motion information acquisition unit 1111 that the subject included in the face region is moving. By performing notification about a suspicious person in motion as discussed above, it is possible to obtain an advantage of easily preventing wrongdoing by performing questioning during the suspicious person being moving. In contrast, notification may be performed for only the suspicious person who is not moving.

Other Example Embodiments

Figure 16:
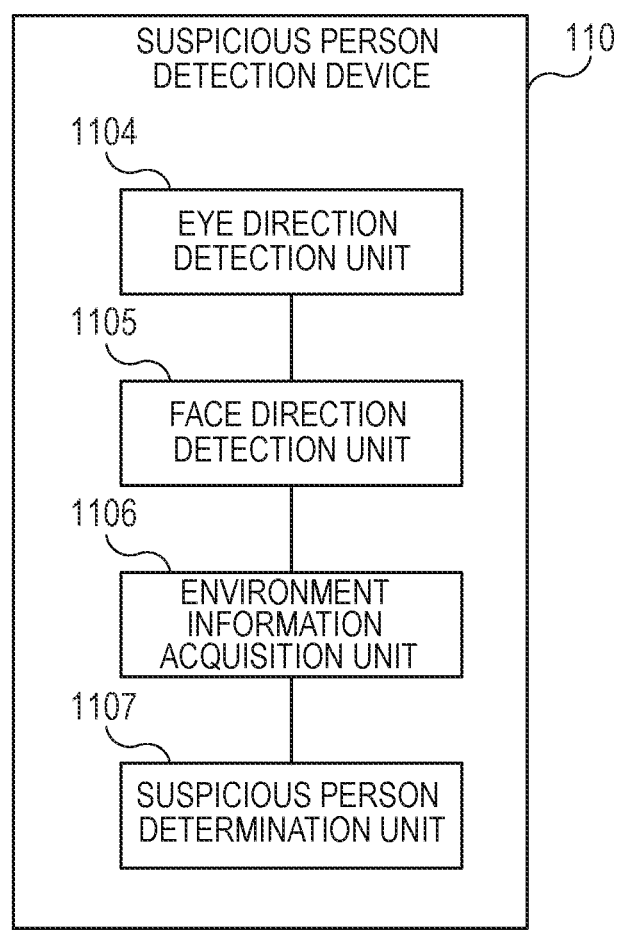
FIG. 16 is a general configuration diagram of a suspicious person detection device according to each example embodiment.

FIG. 16 is a general configuration diagram of the suspicious person detection device 110 according to each example embodiment described above. FIG. 16 illustrates a configuration example used for implementing the function by which the suspicious person detection device 110 detects a suspicious person from an image. The suspicious person detection device 110 has the eye direction detection unit 1104 that detects an eye direction of a subject, the face direction detection unit 1105 that detects a face direction of the subject, the environment information acquisition unit 1106 that acquires environment information indicating arrangement of an object around the subject, and the suspicious person determination unit 1107 that determines whether or not the subject is showing suspicious behavior based on the face direction, the eye direction, and the environment information.

The present invention is not limited to the example embodiments described above and may be changed as appropriate within a scope not departing from the spirit of the present invention, and the configurations described in the example embodiments may be combined as appropriate.

A processing method that stores a program that operates the configuration of the example embodiment to implement the function of each example embodiment described above (more specifically, a program that causes a computer to perform the method illustrated in FIG. 12 and FIG. 13) in a storage medium, reads the program recorded in the storage medium as a code, and executes it in a computer is included in the scope of each example embodiment. That is, a computer readable storage medium is also included in the scope of each example embodiment. Further, not only the storage medium in which the program described above is stored but also the program itself is included in each example embodiment.

As the storage medium, for example, a floppy (registered trademark) disk, a hard disk, an optical disk, a magneto-optical disk, a CD-ROM, a magnetic tape, a non-volatile memory card, or a ROM may be used. Further, without being limited to one executing a process with only the program stored in the storage medium, those operating on an OS to execute a process in corporation with other software or the function of an extension board is included in the scope of each example embodiment.

The whole or part of the example embodiments disclosed above can be described as, but not limited to, the following supplementary notes.

(Supplementary Note 1)

A suspicious person detection device comprising:

an eye direction detection unit that detects an eye direction of a subject;

a face direction detection unit that detects a face direction of the subject;

an environment information acquisition unit that acquires environment information indicating arrangement of an object around the subject; and a determination unit that, based on the face direction, the eye direction, and the environment information, determines whether or not the subject is showing suspicious behavior.

(Supplementary Note 2)

The suspicious person detection device according to supplementary note 1, wherein the environment information indicates a position of the object.

(Supplementary Note 3)

The suspicious person detection device according to supplementary note 2, wherein the determination unit determines whether or not the face direction is oriented to the position of the object and determines that the subject is showing the suspicious behavior when the face direction is oriented to the position of the object and a difference between the face direction and the eye direction is greater than a predetermined threshold.

(Supplementary Note 4)

The suspicious person detection device according to any one of supplementary notes 1 to 3 further comprising a notification unit that performs notification based on the determination, wherein the determination unit accumulates a score associated with the determination, and wherein the notification unit performs the notification based on the score.

(Supplementary Note 5)

The suspicious person detection device according to supplementary note 4, wherein the notification unit performs a first notification based on the determination and performs a second notification based on the score.

(Supplementary Note 6)

The suspicious person detection device according to supplementary note 4 or 5, wherein the notification unit changes a target to be notified of the notification based on the score.

(Supplementary Note 7)

The suspicious person detection device according to any one of supplementary notes 1 to 3 further comprising a notification unit that performs notification based on the determination.

(Supplementary Note 8)

The suspicious person detection device according to any one of supplementary notes 4 to 7, wherein the notification unit performs the notification by using at least one of a mobile terminal that communicates with the suspicious person detection device and a display connected to the suspicious person detection device.

(Supplementary Note 9)

The suspicious person detection device according to any one of supplementary notes 1 to 8 further comprising a motion information acquisition unit that acquires motion information indicating presence or absence of motion of the subject, wherein, based on the face direction, the eye direction, the environment information, and the motion information, the determination unit determines whether or not the subject is showing the suspicious behavior.

(Supplementary Note 10)

The suspicious person detection device according to supplementary note 9 further comprising a notification unit that performs notification based on the determination and the motion information.

(Supplementary Note 11)

A suspicious person detection method comprising steps of:

detecting an eye direction of a subject;

detecting a face direction of the subject;

acquiring environment information indicating arrangement of an object around the subject; and based on the face direction, the eye direction, and the environment information, determining whether or not the subject is showing suspicious behavior.

(Supplementary Note 12)

A program that causes a computer to execute steps of:

detecting an eye direction of a subject;

detecting a face direction of the subject;

acquiring environment information indicating arrangement of an object around the subject; and based on the face direction, the eye direction, and the environment information, determining whether or not the subject is showing suspicious behavior.

The invention claimed is:

1. A suspicious person detection device comprising:
a memory configured to store instructions; and
a processor configured to execute the instructions to:
  detect an eye direction of a subject;
  detect a face direction of the subject;
  determine that the subject is showing suspicious behavior when the face direction is oriented to a position of an object around the subject, and a difference between the face direction and the eye direction is greater than a predetermined threshold;
  perform notification based on the determination;
  accumulate a score associated with the determination;
  perform the notification based on the score; and
  perform a first notification based on the determination and perform a second notification based on the score.

2. The suspicious person detection device according to claim 1, wherein the processor is further configured to execute the instructions to acquire environment information indicating the position of the object.

3. The suspicious person detection device according to claim 1, wherein the processor is further configured to execute the instructions to change a target to be notified of the notification based on the score.

4. The suspicious person detection device according to claim 1, wherein the processor is further configured to execute the instructions to perform the notification by using at least one of a mobile terminal that communicates with the suspicious person detection device and a display connected to the suspicious person detection device.

5. The suspicious person detection device according to claim 1, wherein the processor is further configured to execute the instructions to:
  acquire motion information indicating presence or absence of motion of the subject; and
  determine, based on the face direction, the eye direction, environment information, and the motion information, whether or not the subject is showing the suspicious behavior.

6. The suspicious person detection device according to claim 5, wherein the processor is further configured to execute the instructions to perform notification based on the determination and the motion information.

7. A suspicious person detection method performed by a processor in a computer, the method comprising:
  detecting an eye direction of a subject;
  detecting a face direction of the subject;
  determining that the subject is showing suspicious behavior by determining that the face direction is oriented to a position of an object around the subject, and a difference between the face direction and the eye direction is greater than a predetermined threshold;
  performing notification based on the determination;
  accumulating a score associated with the determination;
  performing the notification based on the score; and
  performing a first notification based on the determination and perform a second notification based on the score.

8. A suspicious person detection device comprising:
a memory configured to store instructions; and
a processor configured to execute the instructions to:
  detect an eye direction of a subject;
  detect a face direction of the subject;
  based on the face direction, and the eye direction determine whether or not the subject is showing suspicious behavior when the face direction is oriented to a position of an object around the subject;
  perform notification based on the determination;
  accumulate a score associated with the determination;
  perform the notification based on the score; and
  perform a first notification based on the determination and perform a second notification based on the score.

9. The suspicious person detection device according to claim 8,
wherein the processor is further configured to execute the instructions to:
  acquire environment information indicating the position of the object; and
  based on the environment information, determine whether or not the face direction is oriented to the position of the object around the subject.

10. The suspicious person detection device according to claim 1, wherein the processor is further configured to execute the instructions to change a target to be notified of the notification based on the score.

* * * * *